United States Patent
Lee et al.

(10) Patent No.: US 11,812,397 B2
(45) Date of Patent: Nov. 7, 2023

(54) METHOD AND DEVICE FOR PERFORMING SYNCHRONIZATION IN NR V2X

(71) Applicant: LG ELECTRONICS INC., Seoul (KR)

(72) Inventors: Seungmin Lee, Seoul (KR); Kyuhwan Kwak, Seoul (KR); Hanbyul Seo, Seoul (KR); Hyukjin Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 365 days.

(21) Appl. No.: 17/258,700

(22) PCT Filed: Aug. 5, 2019

(86) PCT No.: PCT/KR2019/009720
§ 371 (c)(1),
(2) Date: Jan. 7, 2021

(87) PCT Pub. No.: WO2020/027635
PCT Pub. Date: Feb. 6, 2020

(65) Prior Publication Data
US 2021/0235403 A1    Jul. 29, 2021

Related U.S. Application Data

(60) Provisional application No. 62/714,103, filed on Aug. 3, 2018, provisional application No. 62/739,117, filed
(Continued)

(51) Int. Cl.
*H04W 56/00* (2009.01)
*H04W 72/04* (2023.01)
(Continued)

(52) U.S. Cl.
CPC .......... *H04W 56/001* (2013.01); *H04W 4/40* (2018.02); *H04W 72/0453* (2013.01); *H04W 72/56* (2023.01)

(58) Field of Classification Search
None
See application file for complete search history.

(56) References Cited

U.S. PATENT DOCUMENTS 11,509,445 B2 * 11/2022 Peng .......................... H04L 1/00
2018/0131493 A1    5/2018 Luo et al.
(Continued)

OTHER PUBLICATIONS

Samsung, "Summary of synchronization reference priority order for PC5 CA," R1-1807522, 3GPP TSG-RAN WG1 Meeting #93, Busan, Korea, May 24, 2018, See section 2.
(Continued)

*Primary Examiner* — Saba Tsegaye
(74) *Attorney, Agent, or Firm* — BRYAN CAVE LEIGHTON PAISNER LLP

(57) ABSTRACT

A method by which a first device (100) performs sidelink communication is provided. The method can comprise the steps of: determining, from among a plurality of bandwidth parts (BWPs) included in a first carrier, one or more BWPs to be used in order to acquire a priority of the first carrier; selecting one or more synchronization references on the one or more BWPs; and determining a specific priority from among priorities of the one or more synchronization references to be the priority of the first carrier.

14 Claims, 33 Drawing Sheets

Related U.S. Application Data on Sep. 28, 2018, provisional application No. 62/791,715, filed on Jan. 11, 2019.

(51) Int. Cl.
*H04W 72/10* (2009.01)
*H04W 4/40* (2018.01)
*H04W 72/0453* (2023.01)
*H04W 72/56* (2023.01)

(56) References Cited

U.S. PATENT DOCUMENTS

| | | |
|---|---|---|
| 2018/0192383 A1 | 7/2018 | Nam et al. |
| 2018/0368090 A1* | 12/2018 | Kadambar ............ H04W 8/005 |
| 2019/0141647 A1* | 5/2019 | Nimbalker ............ H04W 4/40 |
| 2020/0022041 A1* | 1/2020 | Ly .................... H04W 36/0085 |
| 2020/0029318 A1* | 1/2020 | Guo ...................... H04W 4/40 |
| 2021/0243773 A1* | 8/2021 | Osawa .................. H04L 5/0053 |

OTHER PUBLICATIONS

3GPP, Tsgran, NR, Physical channels and modulation (Release 15), 3GPP TS 38.211 V15.2.0, Jun. 29, 2018, see section 4.4.5.

Intel Corporation, Remaining Synchronization Details for LTE V2V Sidelink Carrier Aggregation, R1-1802365, 3GPP TSG RAN WG1 Meeting #92, Athens, Greece, Feb. 17, 2018, See sections 3.2-4.

* cited by examiner (a)

(b)

(a)

(b)

METHOD AND DEVICE FOR PERFORMING SYNCHRONIZATION IN NR V2X

This application is the National Stage filing under 35 U.S.C. 371 of International Application No. PCT/KR2019/009720, filed on Aug. 5, 2019, which claims the benefit of U.S. Provisional Application No. 62/714,103, filed on Aug. 3, 2018; 62/739,117, filed on Sep. 28, 2018 and 62/791,715, filed on Jan. 11, 2019, the contents of which are all hereby incorporated by reference herein in their entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

FIG. 1 shows examples of 5G usage scenarios to which the technical features of the present disclosure can be applied. The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Meanwhile, in case of the NR sidelink or NR V2X, a carrier may include a plurality of BWPs. Therefore, a UE may need to perform synchronization by considering the plurality of BWPs.

According to an embodiment, there is provided a method of performing sidelink communication by a first device 100. The method may include determining one or more bandwidth parts (BWPs) used to obtain a priority of a first carrier, from among a plurality of BWPs included in the first carrier, selecting one or more synchronization references on the one or more BWPs, and determining a specific priority as the priority of the first carrier among priorities of the one or more synchronization references.

According to another embodiment, there is provided a first device 100 performing sidelink communication. The first device 100 may include one or more memories, one or more transceivers, and one or more processors coupling the one or more memories and the one or more transceiver. The processor may be configured to determine one or more BWPs used to obtain a priority of a first carrier, from among a plurality of BWPs included in the first carrier, select one or more synchronization references on the one or more BWPs, and determine a specific priority as the priority of the first carrier among priorities of the one or more synchronization references.

A UE can effectively perform synchronization in sidelink communication.

DESCRIPTION OF EXEMPLARY EMBODIMENTS

In this document, the term "/" and "," should be interpreted to indicate "and/or". For instance, the expression "A/B" may mean "A and/or B". Further, "A, B" may mean "A and/or B". Further, "A/B/C" may mean "at least one of A, B, and/or C". Also, "A, B, C" may mean "at least one of A, B, and/or C".

Further, in the document, the term "or" should be interpreted to indicate "and/or". For instance, the expression "A or B" may comprise 1) only A, 2) only B, and/or 3) both A and B. In other words, the term "or" in this document should be interpreted to indicate "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
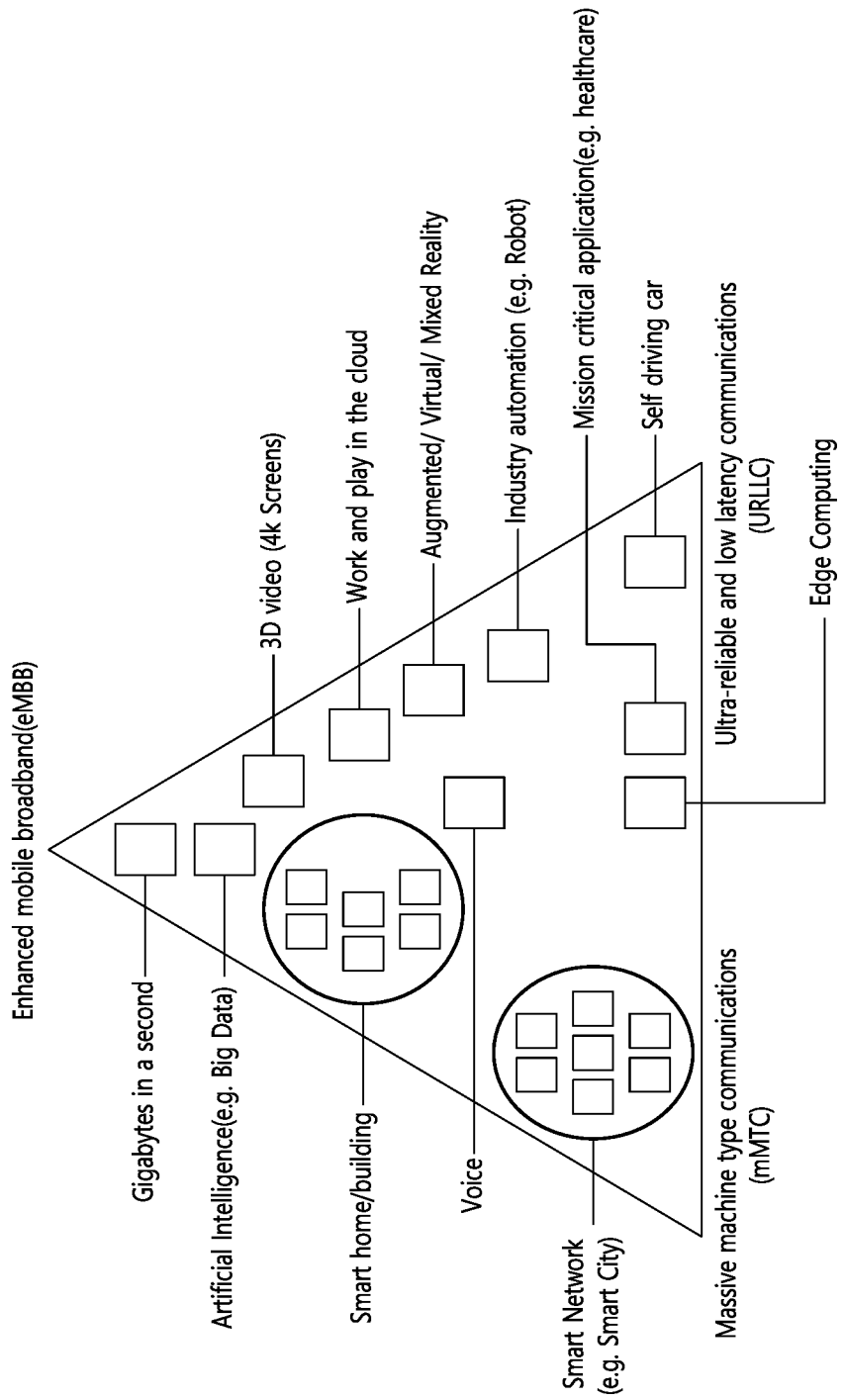
FIG. 1 shows examples of 5G usage scenarios to which the technical features of the present disclosure can be applied.
Figure 2:
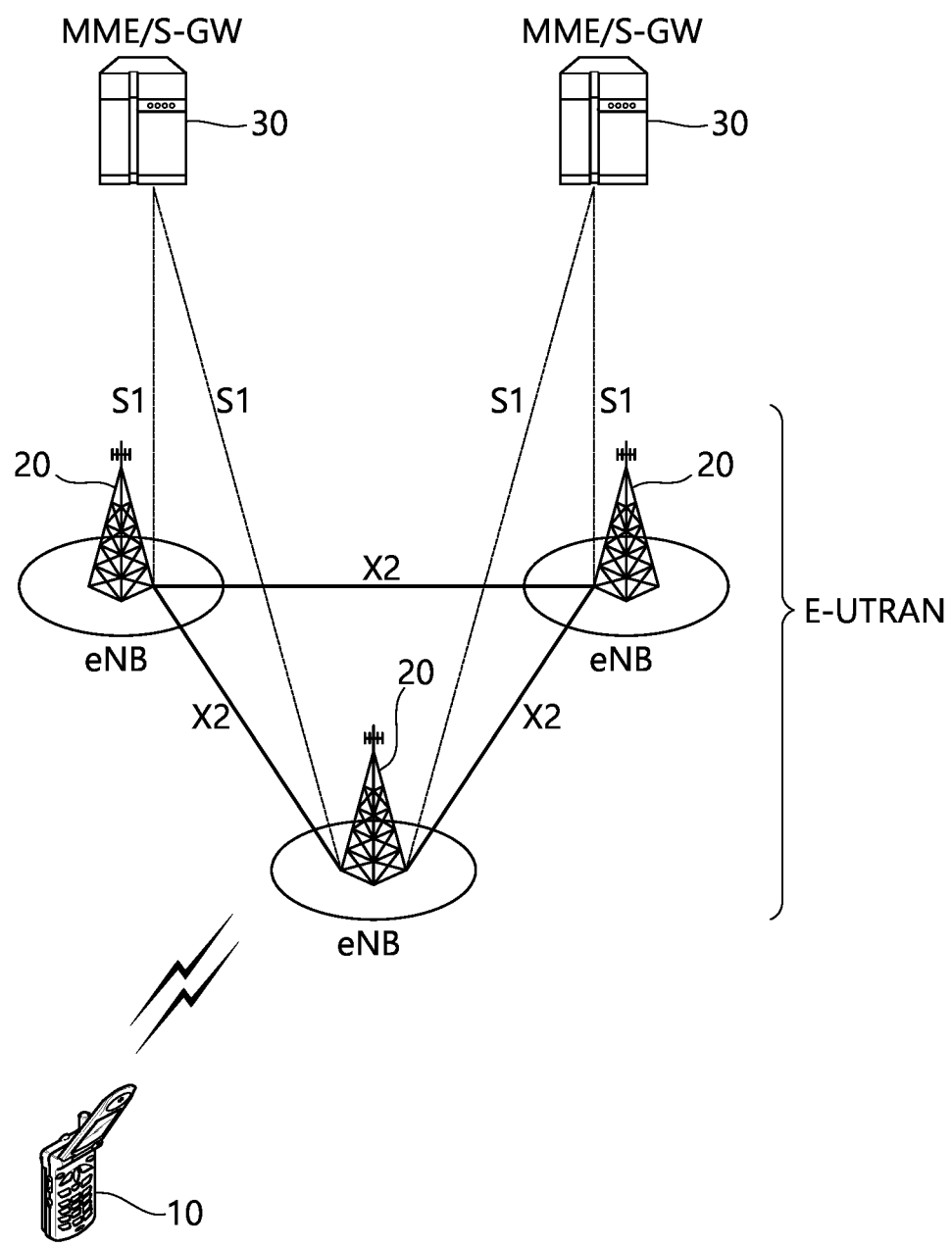
FIG. 2 shows a structure of an LTE system to which an exemplary embodiment of the present disclosure can be applied.

FIG. 2 shows a structure of an LTE system to which an exemplary embodiment of the present disclosure can be applied. This may also be referred to as an Evolved-UMTS Terrestrial Radio Access Network (E-UTRAN), or a Long Term Evolution (LTE)/LTE-A system.

Referring to FIG. 2, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 3:
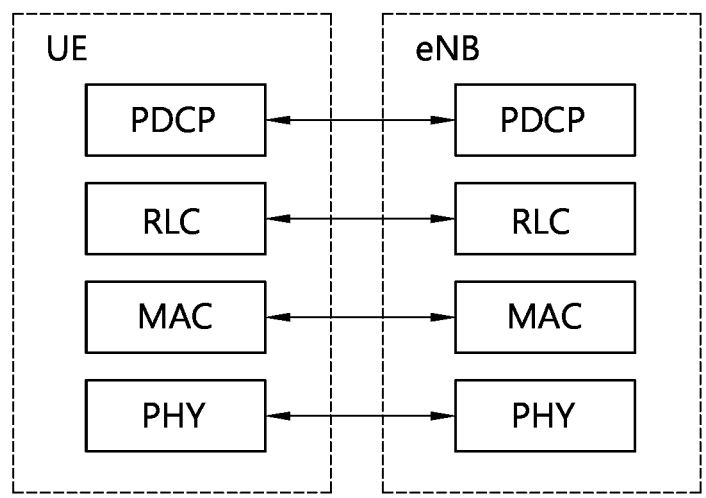
FIG. 3 shows a radio protocol architecture of a user plane to which an exemplary embodiment of the present disclosure can be applied.
Figure 4:
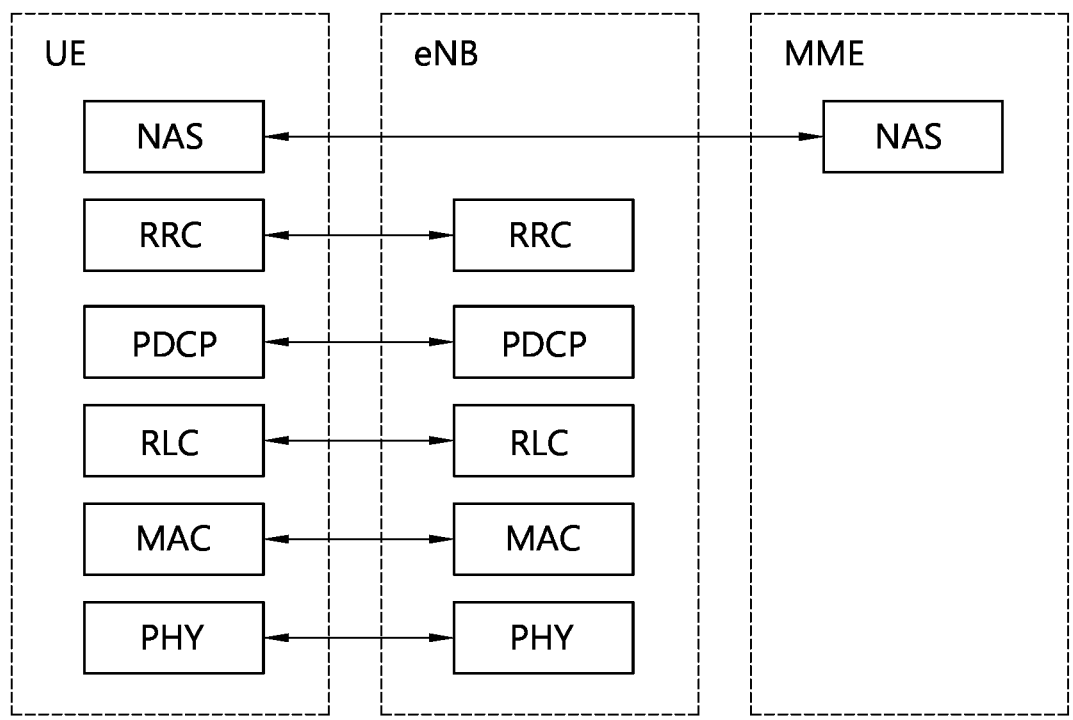
FIG. 4 shows a radio protocol architecture of a control plane to which an exemplary embodiment of the present disclosure can be applied.

FIG. 3 shows a radio protocol architecture of a user plane to which an exemplary embodiment of the present disclosure can be applied. FIG. 4 shows a radio protocol architecture of a control plane to which an exemplary embodiment of the present disclosure can be applied. The user plane is a protocol stack for user data transmission, and the control plane is a protocol stack for control signal transmission.

Referring to FIG. 3 and FIG. 4, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 5:
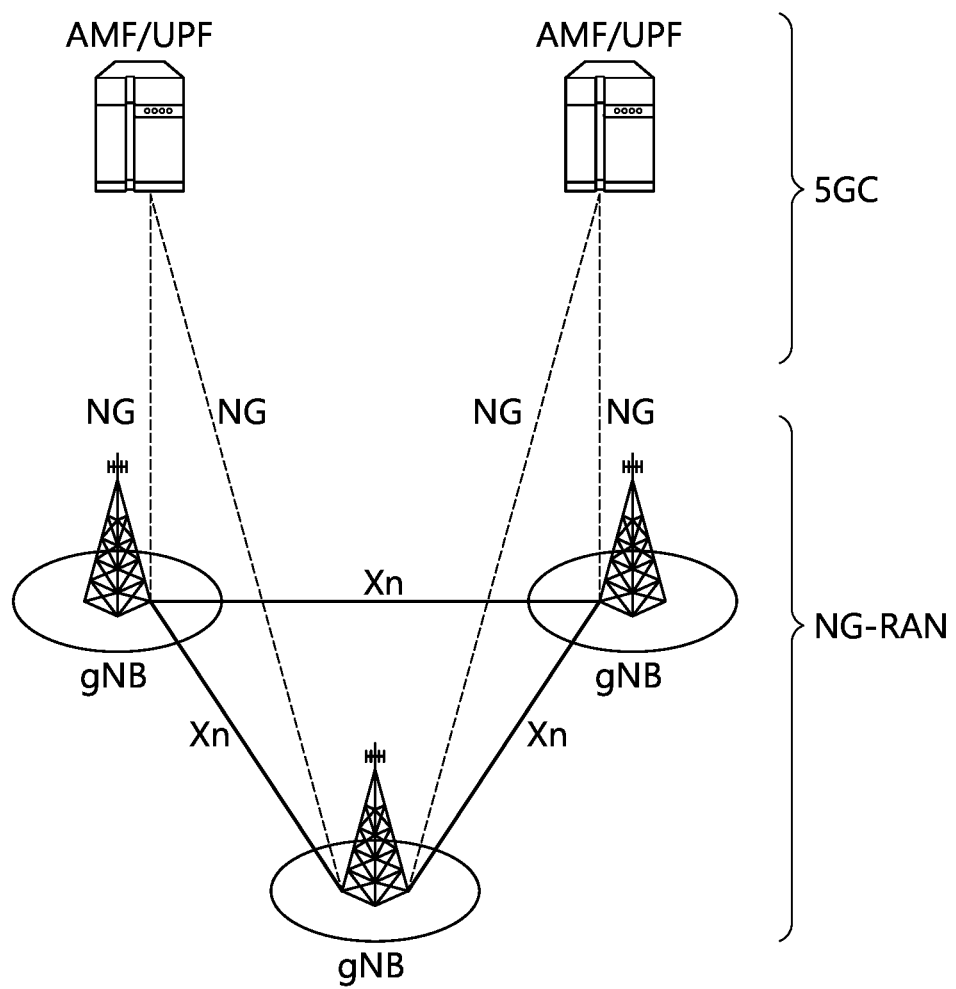
FIG. 5 shows a structure of an NR system to which an exemplary embodiment of the present disclosure can be applied.

FIG. 5 shows a structure of an NR system to which an exemplary embodiment of the present disclosure can be applied.

Referring to FIG. 5, an NG-RAN may include a gNB and/or eNB providing a user plane and control plane protocol termination to a user. FIG. 5 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 6:
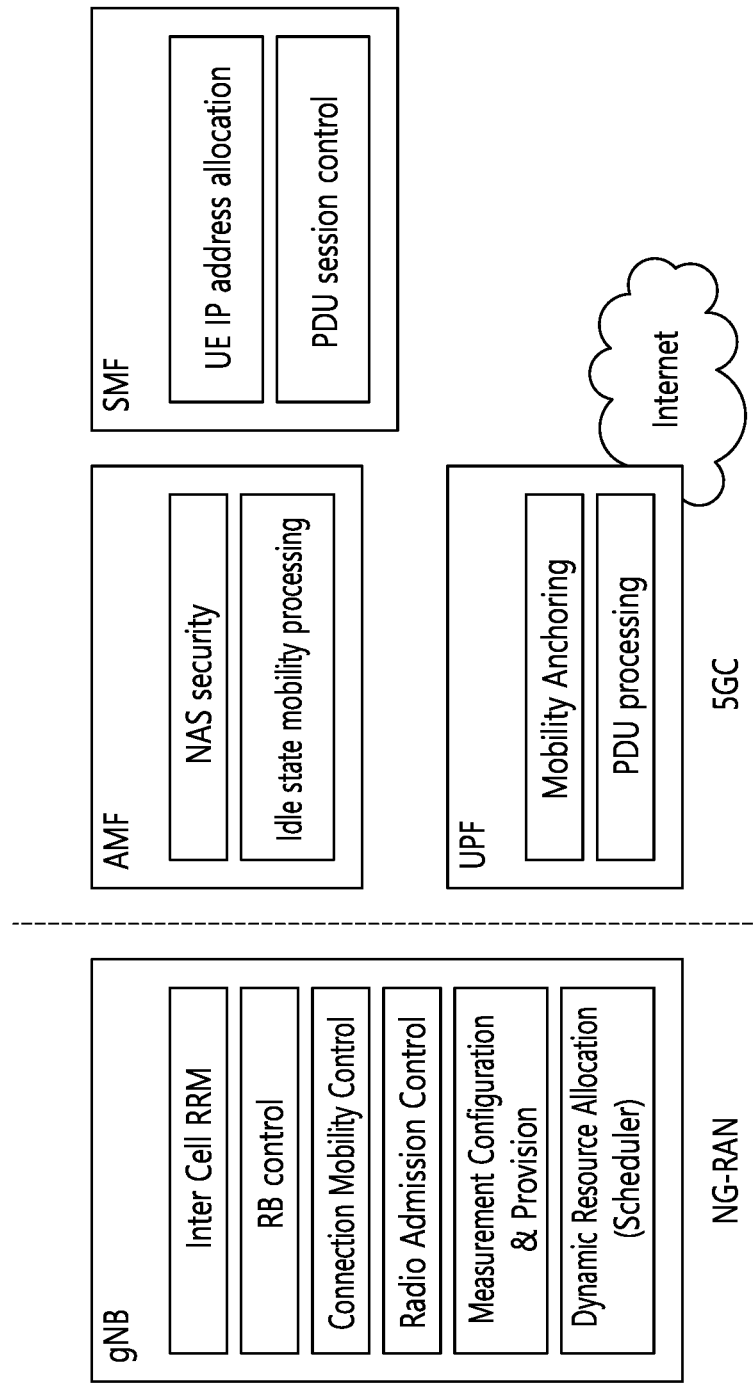
FIG. 6 shows a functional division between an NG-RAN and a 5GC to which an exemplary embodiment of the present disclosure can be applied.

FIG. 6 shows a functional division between an NG-RAN and a 5GC to which an exemplary embodiment of the present disclosure can be applied.

Referring to FIG. 6, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 7:
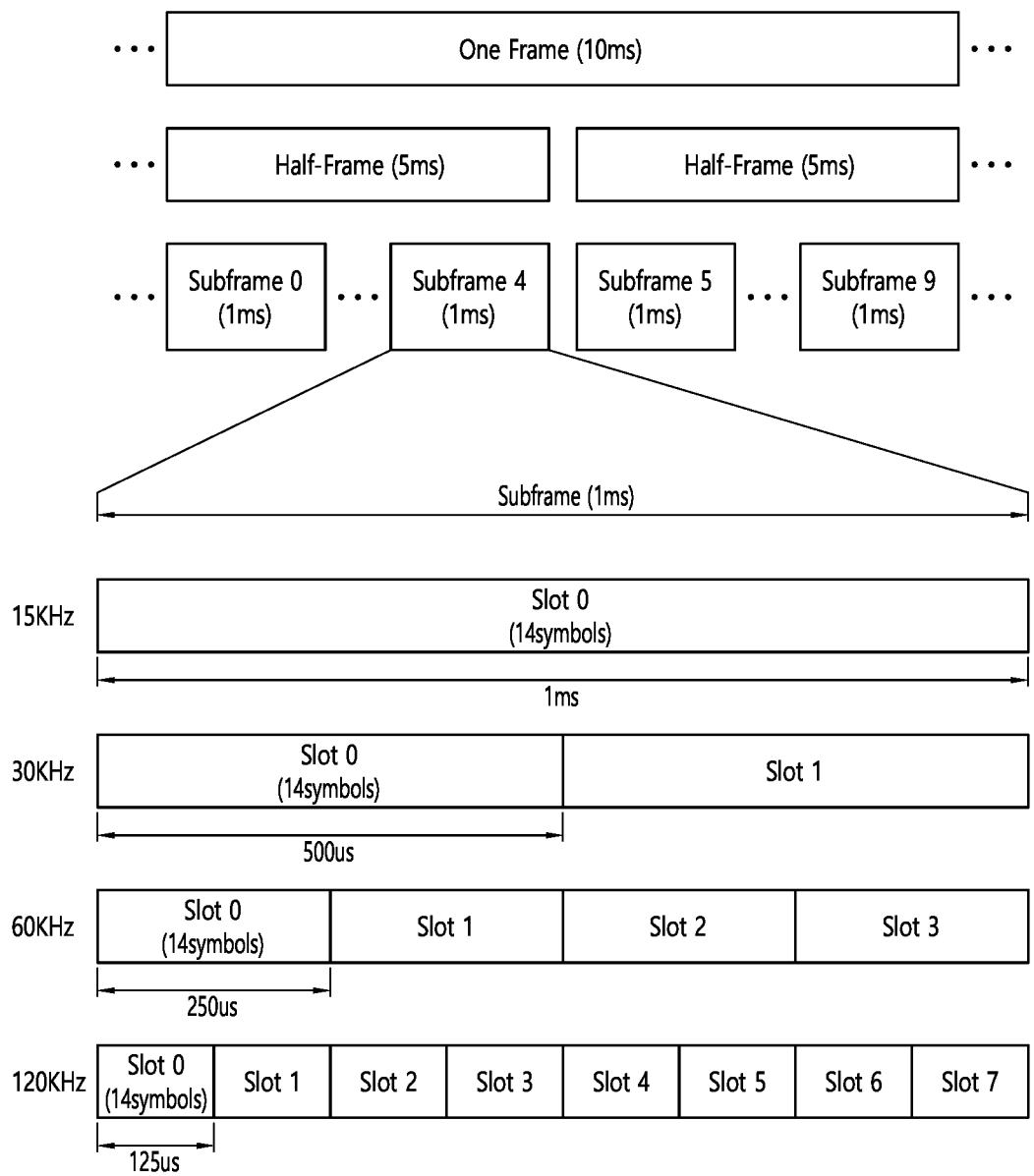
FIG. 7 shows a structure of a radio frame of an NR to which an exemplary embodiment of the present disclosure can be applied.

FIG. 7 shows a structure of a radio frame of an NR to which an exemplary embodiment of the present disclosure can be applied.

Referring to FIG. 7, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
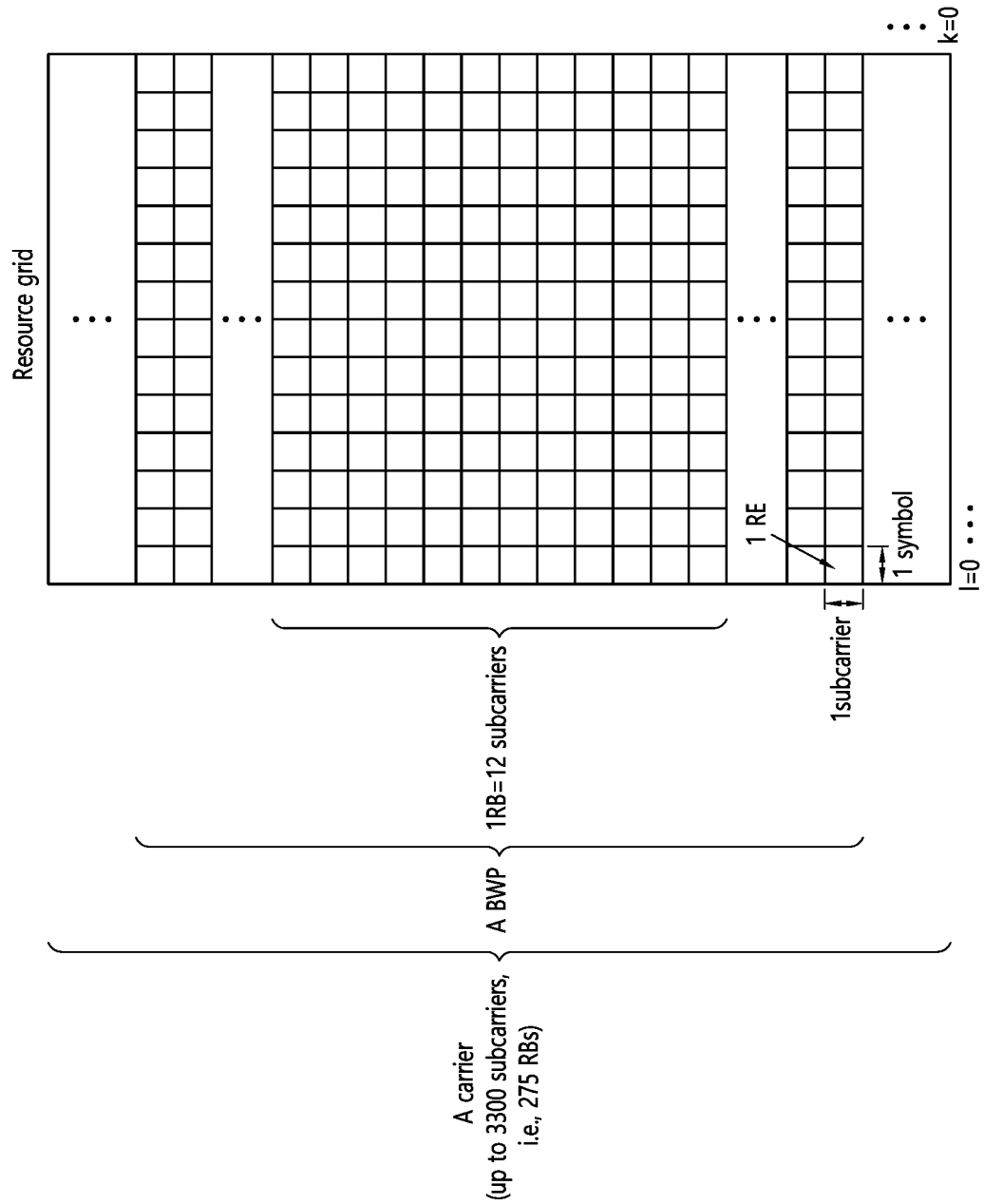
FIG. 8 shows a structure of a slot of an NR frame to which an exemplary embodiment of the present disclosure can be applied.

FIG. 8 shows a structure of a slot of an NR frame to which an exemplary embodiment of the present disclosure can be applied.

Referring to FIG. 8, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

Figure 9:
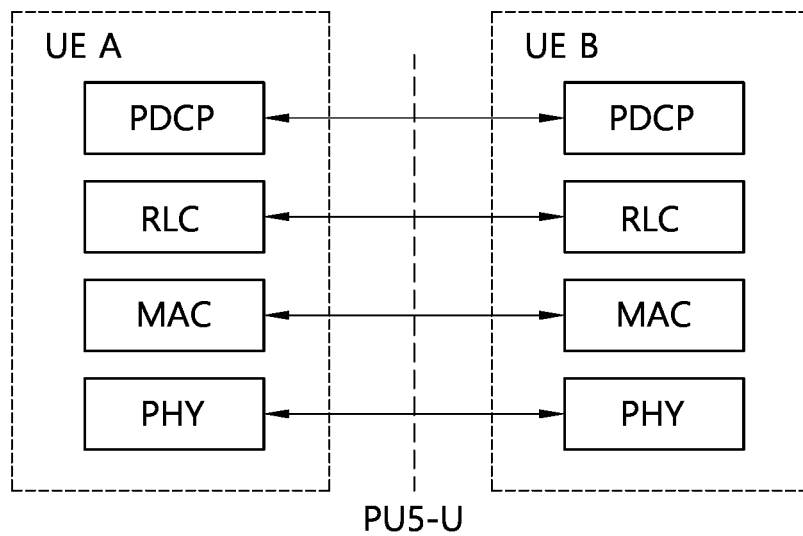
FIG. 9 shows a protocol stack for a sidelink communication to which the exemplary embodiment of the present disclosure can be applied.
Figure 9:
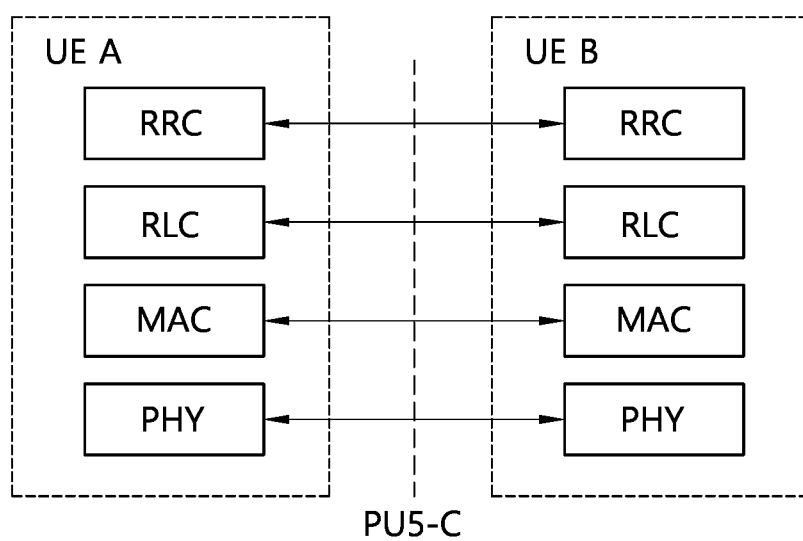

FIG. 9 shows a protocol stack for a sidelink communication to which the exemplary embodiment of the present disclosure can be applied. More specifically, (a) of FIG. 9 represents a user plane protocol stack of LTE, and (b) of FIG. 9 represents a control plane protocol stack of LTE.

Figure 10:
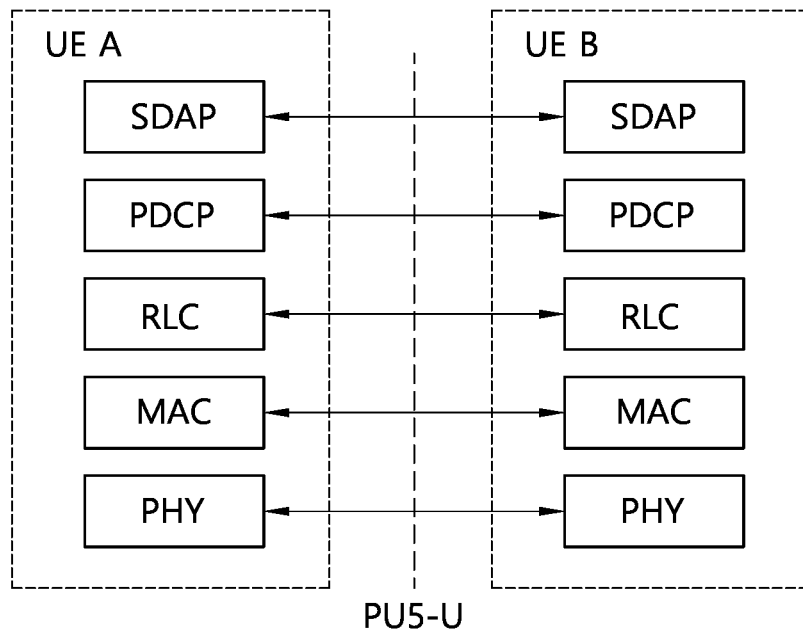
FIG. 10 shows a protocol stack for a sidelink communication to which the exemplary embodiment of the present disclosure can be applied.
Figure 10:
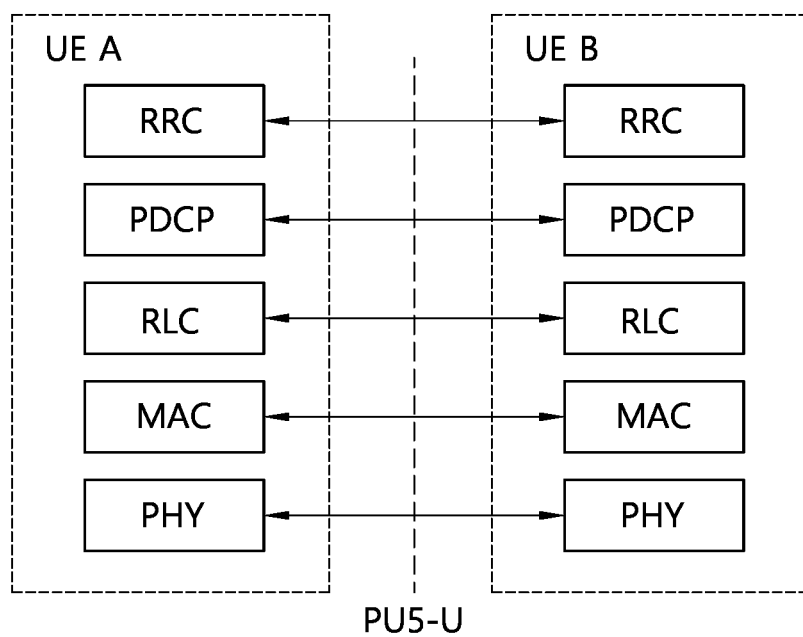

FIG. 10 shows a protocol stack for a sidelink communication to which the exemplary embodiment of the present disclosure can be applied. More specifically, (a) of FIG. 10 represents a user plane protocol stack of NR, and (b) of FIG. 10 represents a control plane protocol stack of NR.

Hereinafter, Sidelink Synchronization Signal (SLSS) and synchronization information will be described in detail.

SLSS is a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving sidelink signals is transmitted. For example, the basic information may be information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
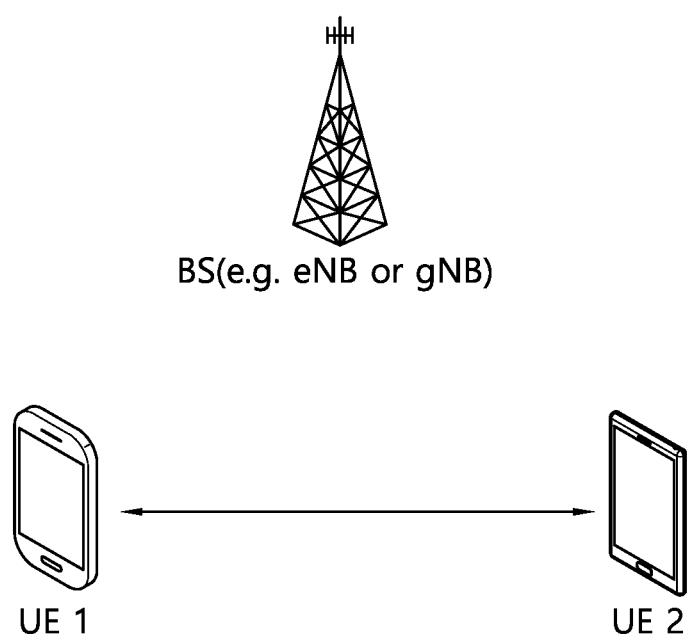
FIG. 11 shows a UE performing V2X or sidelink communication to which an exemplary embodiment of the present disclosure can be applied.

FIG. 11 shows a UE performing V2X or sidelink communication to which an exemplary embodiment of the present disclosure can be applied.

Referring to FIG. 11, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which is a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 12:
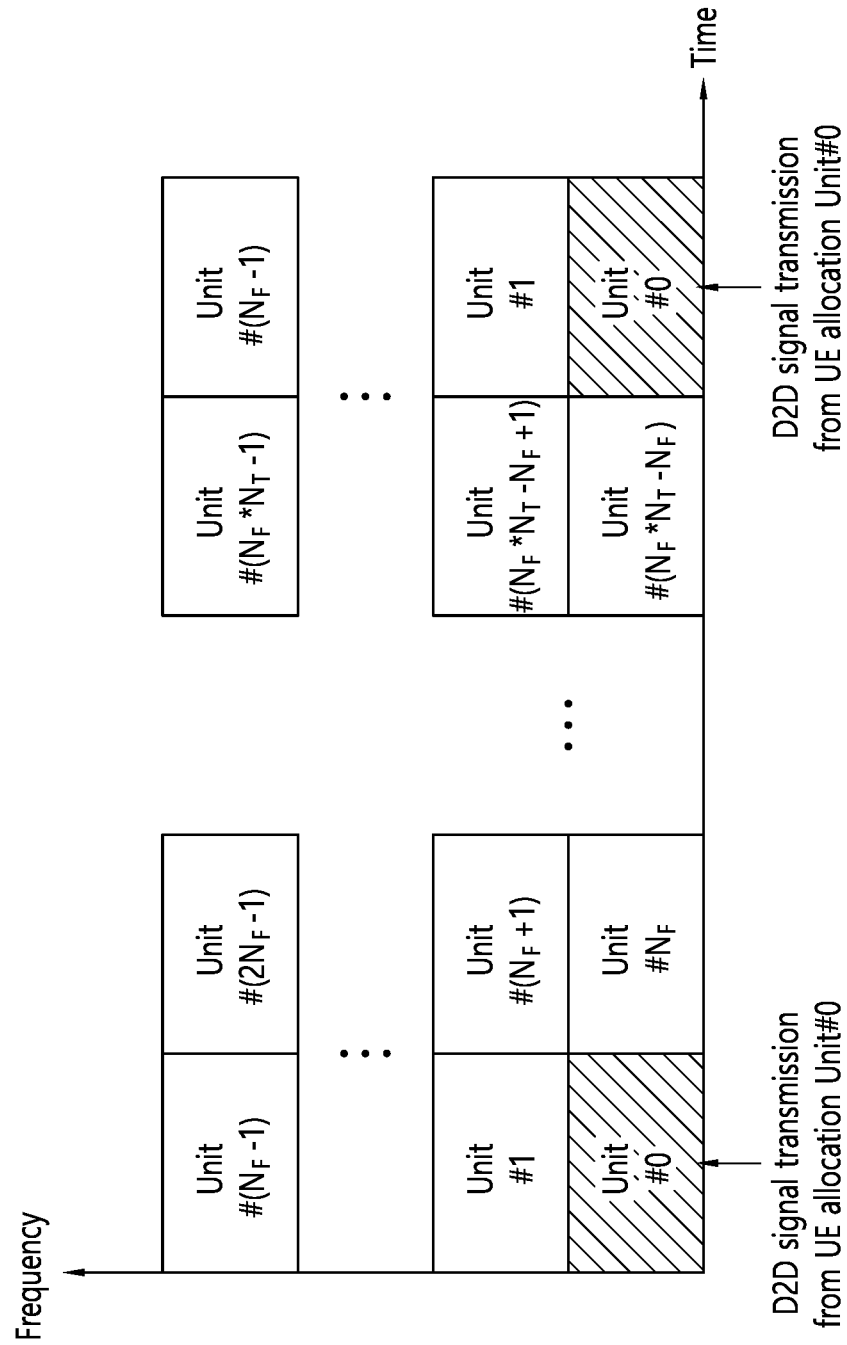
FIG. 12 shows an exemplary configuration of a resource unit to which an exemplary embodiment of the present disclosure can be applied.

FIG. 12 shows an exemplary configuration of a resource unit to which an exemplary embodiment of the present disclosure can be applied.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of NT number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may be a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may be a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel In other words, REs that were used for transmitting SA information within a separate resource unit of the SA resource pool may still be used for transmitting sidelink data from the resource pool of a sidelink data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 13:
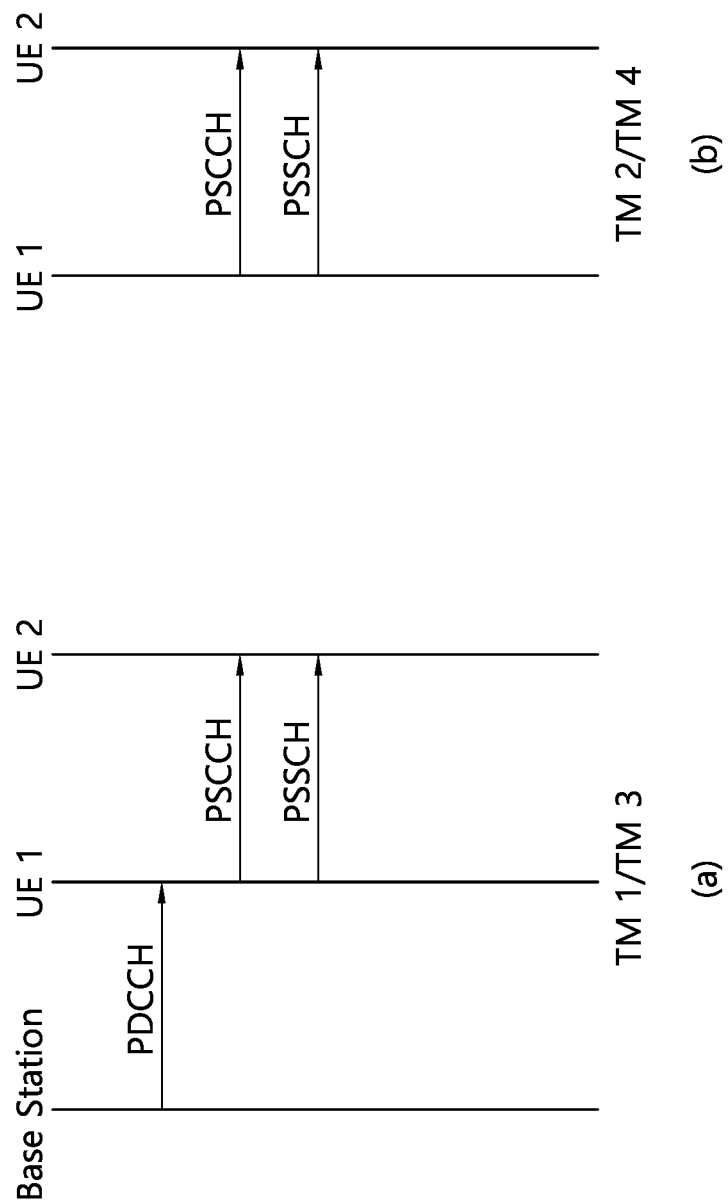
FIG. 13 shows user equipment (UE) operations according to a transmission mode (TM) being related to sidelink/V2X communication to which an exemplary embodiment of the present disclosure can be applied.

FIG. 13 shows user equipment (UE) operations according to a transmission mode (TM) being related to sidelink/V2X communication to which an exemplary embodiment of the present disclosure can be applied.

(a) of FIG. 13 represents UE operations being related to transmission mode 1 or transmission mode 3, and (b) of FIG. 13 represents UE operations being related to transmission mode 2 or transmission mode 4.

Referring to (a) of FIG. 13, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 13, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may be a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 14:
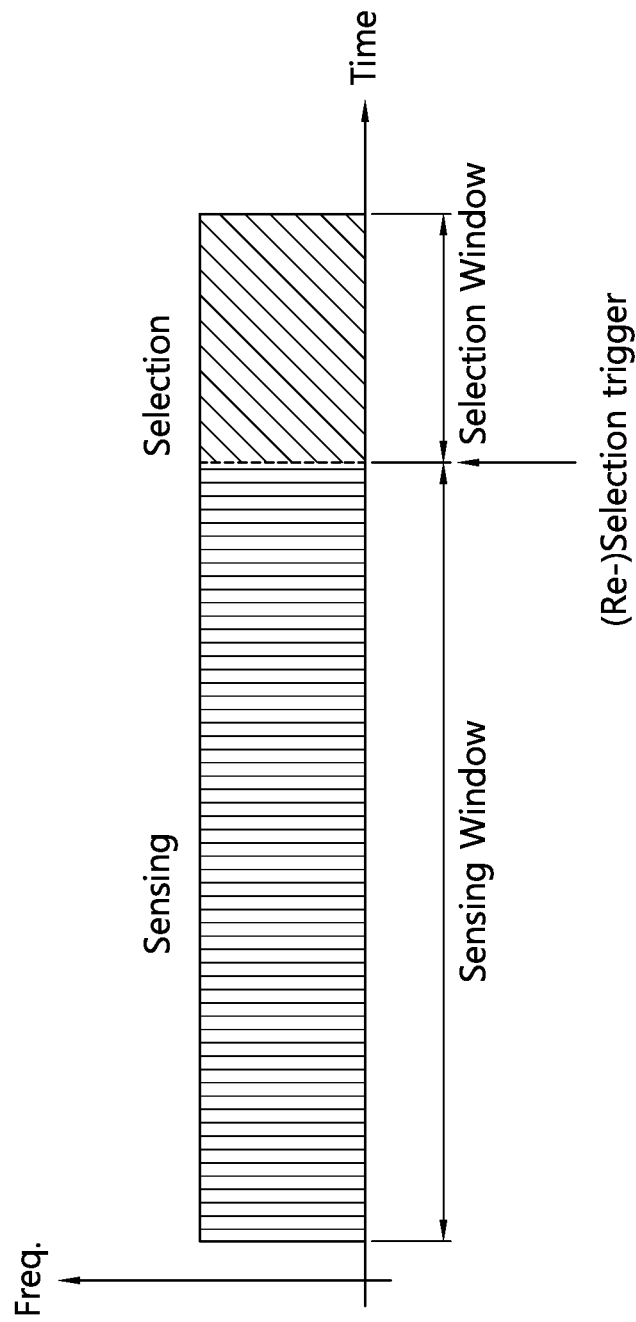
FIG. 14 shows an example where a transmission resource to which an exemplary embodiment of the present disclosure can be applied.

FIG. 14 shows an example where a transmission resource to which an exemplary embodiment of the present disclosure can be applied.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 15:
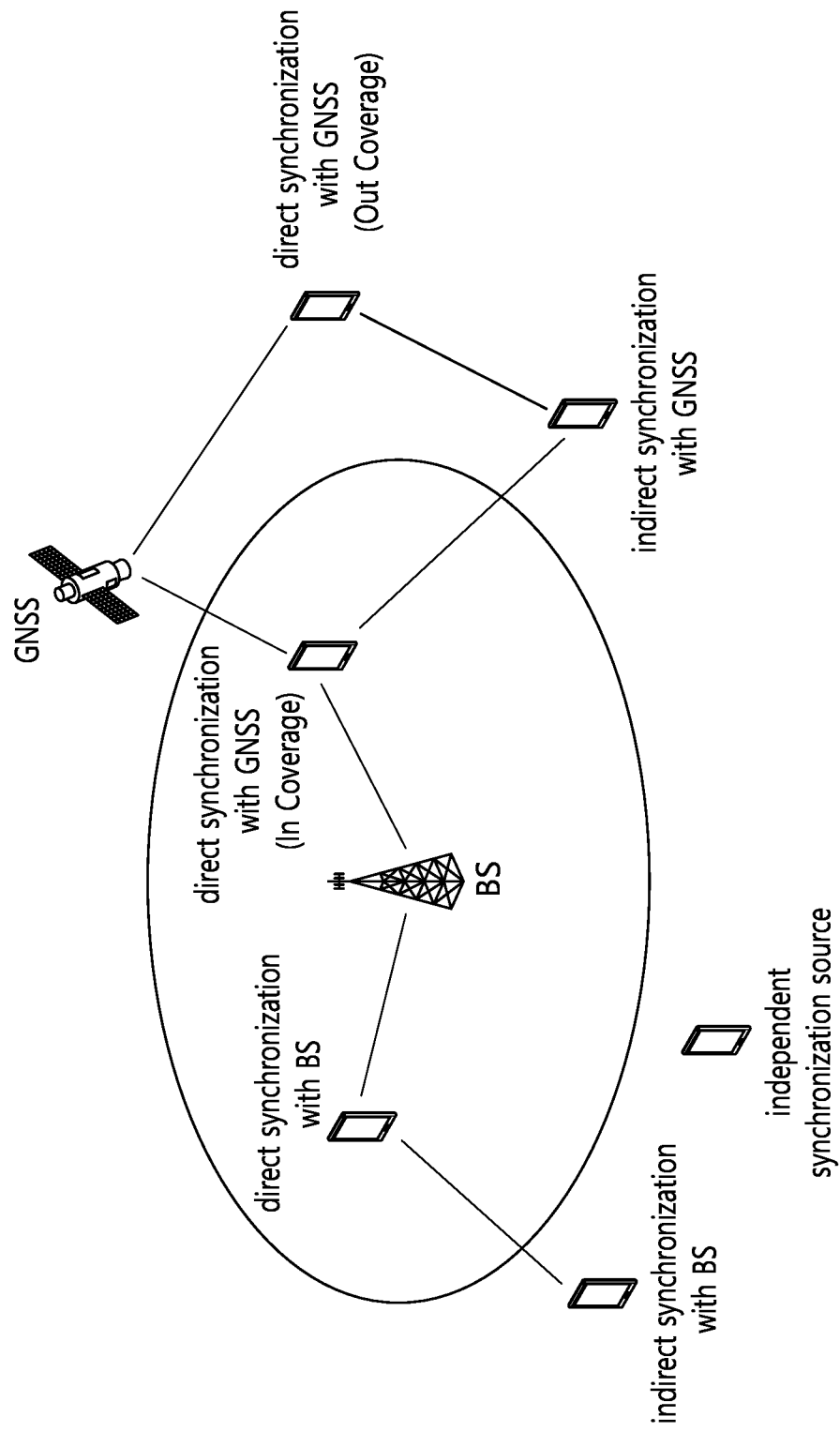
FIG. 15 shows a synchronization source or synchronization reference of V2X to which an exemplary embodiment of the present disclosure can be applied.

FIG. 15 shows a synchronization source or synchronization reference of V2X to which an exemplary embodiment of the present disclosure can be applied.

Referring to FIG. 15, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 3. Table 3 is for exemplary purposes only, and the relation between the synchronization source and the synchronization priority may be defined in various forms.

TABLE 3

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre-)configured. In a single-carrier operation, the UE may derive transmission timing of the UE from an available synchronization reference having the highest priority.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 16:
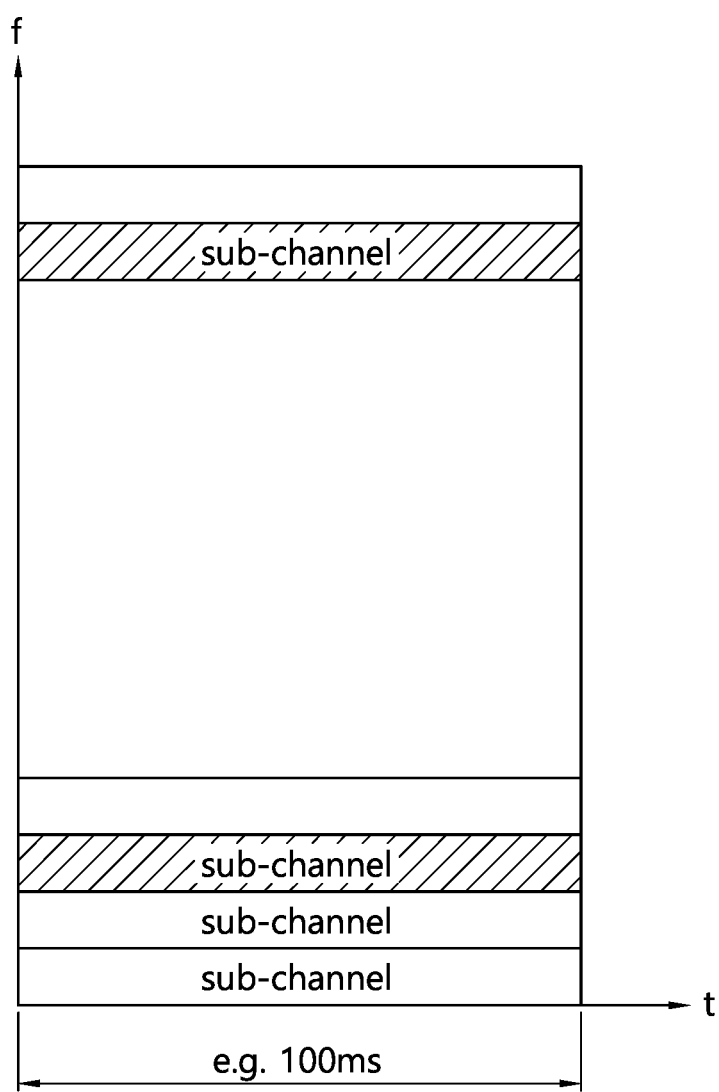
FIG. 16 shows a CBR to which an exemplary embodiment of the present disclosure can be applied.

FIG. 16 shows a CBR to which an exemplary embodiment of the present disclosure can be applied.

Referring to FIG. 16, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 16, if it is assumed that a hatched sub-channel is a sub-channel having a value greater than or equal to a pre-configured threshold, the CBR may denote a ratio of the hatched sub-channels for a period of 100 ms.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, a bandwidth part (BWP) and a carrier will be described.

The BWP may be a consecutive set of physical resource blocks (PRBs) in a given numerology. The PRB may be selected from a consecutive subset of common resource blocks (CRBs) for a given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive a PDCCH, a PDSCH, or a CSI-RS (however, an RRM is excluded) outside the active DL BWP. For example, the UE may not trigger a CSI report for an inactive DL BWP. For example, the UE may not transmit a PUCCH or a PUSCH outside the active UL BWP. For example, in a downlink case, the initial BWP may be given as a consecutive RB set for an RMSI CORESET (configured by a PBCH). For example, in an uplink case, the initial BWP may be given by an SIB for a random access procedure. For example, the default BWP may be configured by a higher layer. For example, an initial value of the default BWP may be an initial DL BWP. For energy saving, if the UE cannot detect DCI for a specific period of time, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 17:
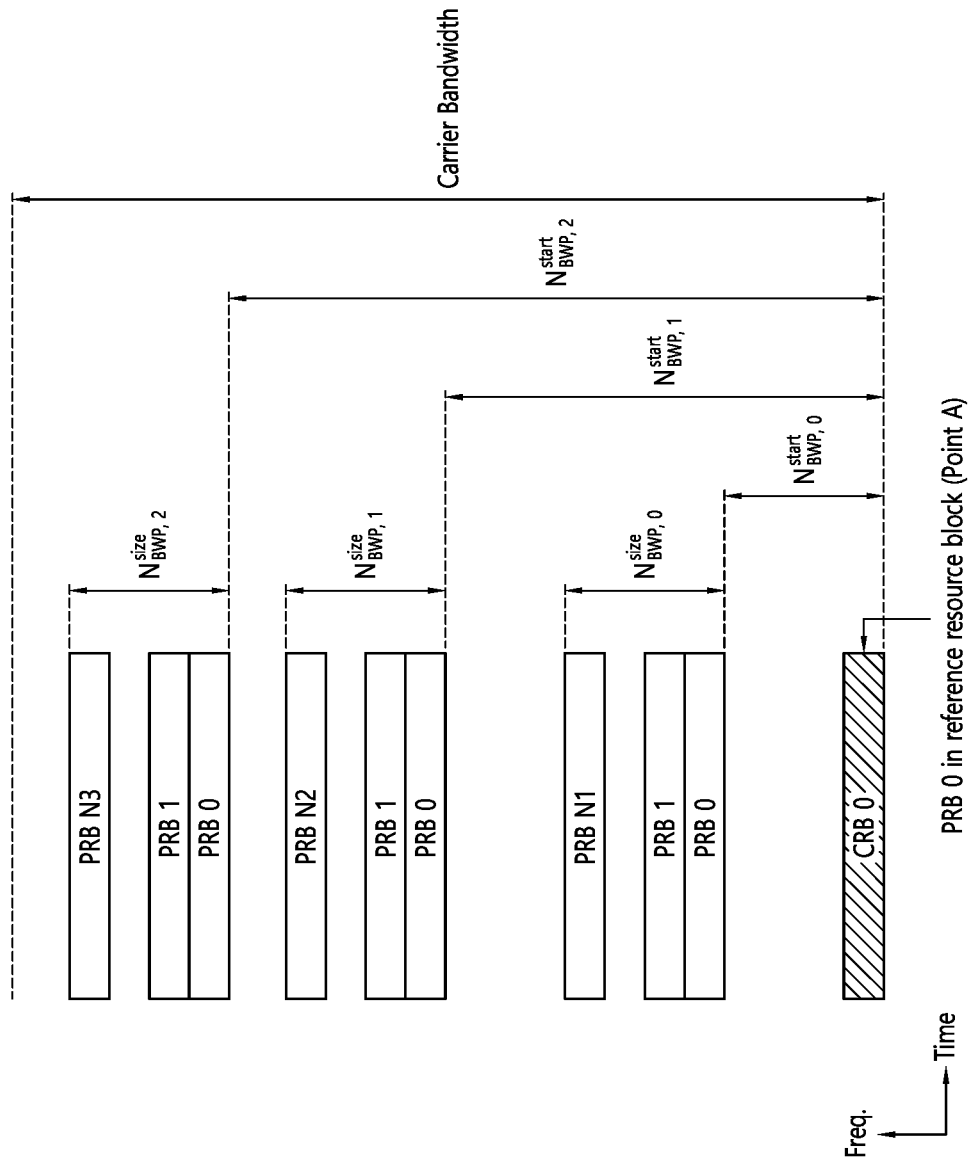
FIG. 17 shows a BWP to which an exemplary embodiment of the present disclosure can be applied.

FIG. 17 shows a BWP to which an exemplary embodiment of the present disclosure can be applied. It is assumed in the embodiment of FIG. 17 that the number of BWPs is 3.

Referring to FIG. 17, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Meanwhile, in case of the LTE V2X, the UE may perform a synchronization operation according to the following rule in a carrier aggregation (CA) situation, by considering an asynchronous transmitting operation of the UE, an asynchronous receiving operation of the UE, and/or a (UE implementation) complexity based on implementation of a synch searcher.

First, from among sets of carriers which can be subjected to TX/RX CA, a set of carriers (hereinafter, SET A) which can be used as a synchronization carrier may be configured. In addition, the UE may determine a set of available synchronization carriers (hereinafter, SET B) from the SET A, by considering a currently aggregated carrier. Herein, the SET A may be identical to a set of carriers which can be subjected to TX/RX CA. Alternatively, the SET A may be a subset of the set of carriers which can be subjected to TX/RX CA. In addition, the SET B may be identical to the SET A. Alternatively, the SET B may be a subset of the SET A.

For example, when one synchronization carrier is present in the SET B, the UE may derive a time and/or frequency synchronization of all aggregated carriers from a synchronization reference of the synchronization carrier.

For example, when a plurality of synchronization carriers are present in the SET B, the UE may select a carrier having a synchronization reference of a highest priority. In addition, the UE may derive a time and/or frequency synchronization of all aggregated carriers from the synchronization reference of the highest priority. Herein, the UE may not perform reselection for the synchronization carrier as long as the UE does not lose the synchronization. In the present specification, for convenience of explanation, the synchronization carrier from which the time and/or frequency synchronization of the aggregated carrier is derived may be referred to as SYNCH_REFERCC.

For example, when the synchronization carrier is not present in the SET B, the UE may perform an independent synchronization operation for each carrier.

For example, whether an SLSS will be transmitted only in the SYNCH_REFERCC or will be transmitted in all synchronization carriers in the SET B may be configured according to UE capability.

Additionally, for example, for the aggregated carrier, a DFN value, a DFN offset, a location of an SLSS resource, and/or the number of SLSS resources may be configured identically. Therefore, for example, V2X communication and/or pool-related logical indices may be matched between the aggregated carriers. For example, even if the SLSS resource is configured in a carrier, whether the UE will perform SLSS transmission in practice may be additionally configured or pre-configured.

Additionally, for example, when the UE transmits an SLSS and/or a PSBCH, an SLSS ID and an in-coverage indicator and/or out-coverage indicator on the PSBCH may conform to a synchronization reference (e.g., a selected synchronization reference) of the SYNCH_REFERCC. On the other hand, other information of the PSBCH (e.g., SL bandwidth, TDD configuration, reserved bit value, etc.) may conform to that of a carrier on which the SLSS and/or the PSBCH are transmitted.

Meanwhile, as described above, the BWP is introduced in the NR sidelink or the NR V2X. Therefore, it is necessary to propose a method in which a UE performs a synchronization operation in a situation where there is a carrier including one or more BWPs or in a situation where a carrier including one or more BWPs is aggregated. Hereinafter, according to an embodiment of the present disclosure, a method in which a UE performs a sidelink (SL) synchronization operation by considering a BWP and an apparatus supporting the method will be described.

In the present specification, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. In the present specification, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present specification, a receiving operation of the UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or WAN DL signal (e.g., PDCCH, PDSCH, PSS/SSS, etc.). The receiving operation of the UE may include a sensing operation and/or a CBR measuring operation. In the present specification, the sensing operation of the UE may include a PSSCH-RSRP measuring operation based on a PSSCH DM-RS sequence, a PSSCH-RSRP measuring operation based on a PSSCH DM-RS sequence scheduled by a PSCCH successfully decoded by the UE, a sidelink RSSI (S-RSSI) measuring operation, and/or an S-RSSI measuring operation based on a sub-channel related to a V2X resource pool. In the present specification, a transmitting operation of the UE may include a transmitting operation of a sidelink channel and/or a sidelink signal (e.g., PSCCH, PSSCH, PSFCH, PSBCH, PSSS/SSSS, etc.). The transmitting operation of the UE may include a transmitting operation of a WAN UL channel and/or a WAN UL signal (e.g., PUSCH, PUCCH, SRS, etc.). In the present specification, a synchronization signal may include an SLSS and/or a PSBCH.

In the present specification, an operation in which the UE performs CBR measurement for the BWP may include an operation in which the UE performs CBR measurement on one or more pools configured in the BWP. The CBR for the BWP may include a CBR measured on the one or more pools configured in the BWP. In the present specification, the BWP may include one or more resource pools.

For example, the UE may perform CBR measurement for one resource pool included in one BWP, and the UE may determine a CBR value measured in the one resource pool as the CBR value of the BWP.

For example, the UE may perform CBR measurement for a plurality of resource pools included in one BWP, and the UE may determine the CBR values of the BWP, based on the CBR values measured in the plurality of resource pools. For example, when the UE performs the CBR measurement for the plurality of resource pools, the UE may consider/determine a maximum value among the CBR measurement values as the CBR values of the BWP. For example, when the UE performs the CBR measurement for the plurality of resource pools, the UE may consider/determine a minimum value among the CBR measurement values as the CBR values of the BWP. For example, when the UE performs the CBR measurement for the plurality of resource pools, the UE may consider/determine an average value of the CBR measurement values or a weight average value as the CBR value of the BWP. For example, when the UE performs the CBR measurement for the plurality of resource pools, the UE may consider/determine a sum of the CBR measurement values as the CBR value of the BWP. For example, when the UE performs the CBR measurement for the plurality of resource pools, the UE may consider/determine a CBR value measured in a pre-configured resource pool as the CBR value of the BWP. For example, when the UE performs the CBR measurement for the plurality of resource pools, the UE may consider/determine a CBR value measured in a pre-configured resource pool related to a lowest index as the CBR value of the BWP. For example, when the UE performs the CBR measurement for the plurality of resource pools, the UE may consider/determine a CBR value measured in a resource pool related to a highest index as the CBR value of the BWP. For example, when the UE performs the CBR measurement for the plurality of resource pools, the UE may consider/determine a CBR value measured in a resource pool having a great CR value (e.g., a resource pool in which CR with a margin against CR_LIMIT is greater than or equal to a pre-configured threshold) as the CBR value of the BWP. For example, when the UE performs the CBR measurement for the plurality of resource pools, the UE may consider/determine a CBR value measured in a resource pool having a small CR value (e.g., a resource pool in which CR with a margin against CR_LIMIT is greater than or equal to a pre-configured threshold) as the CBR value of the BWP.

Some or all of the methods proposed in the present specification may be limited to a transmitting operation of the UE, a transmission carrier selecting operation, and/or a transmission BWP selecting operation. Alternatively, for example, some or all of the methods proposed in the present specification may be limited to a receiving operation of the UE, a reception carrier selecting operation, and/or a reception BWP selecting operation. In the present specification, a configuration may include signaling, signaling from the network, a configuration from the network, and/or a pre-configuration from the network.

Figure 18:
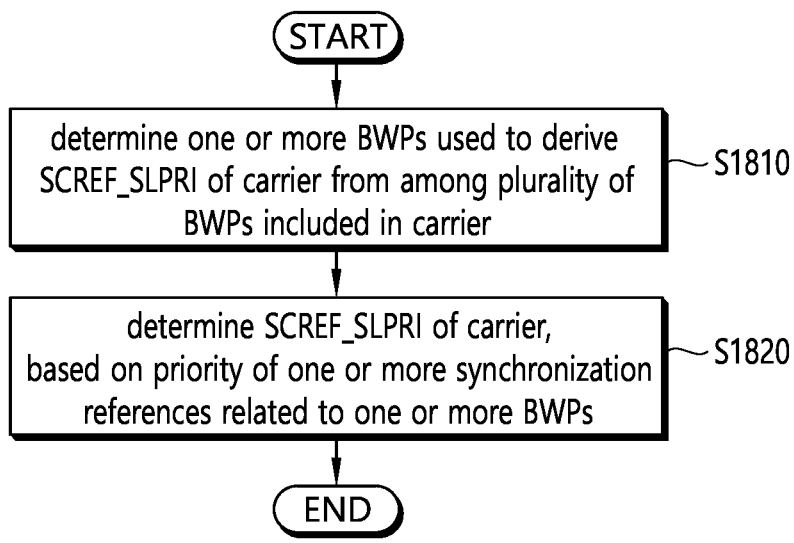
FIG. 18 shows a method in which a UE determines a priority of a carrier including one or more BWPs, according to an embodiment of the present disclosure.

FIG. 18 shows a method in which a UE determines a priority of a carrier including one or more BWPs, according to an embodiment of the present disclosure.

The UE may derive a priority of a carrier in which a plurality of BWPs are configured (e.g., a representative synchronization reference SL priority), based on some or all of rules proposed below. In the present specification, for convenience of explanation, the representative synchronization reference SL priority may be referred to as SCREF_SL-PRI. Herein, for example, the UE may use the SCREF_SL-PRI to select SYNCH_REFERCC from among synchronization carriers included in the SET B.

For example, the plurality of BWPs may be BWPs configured for the UE. For example, the plurality of BWPs may be active BWPs. For example, when the plurality of BWPs are configured for the UE in the form of FDM and the plurality of BWPs are activated, a plurality of active BWPs may be present at a given time. For example, when the plurality of BWPs are configured for the UE in the form of TDM and the plurality of BWPs are activated, one active BWP may be present at a given time.

Referring to FIG. 18, in step S1810, the UE may determine or select one or more BWPs used to derive SCREF_SLPRI of a carrier from among a plurality of BWPs included in a carrier. For example, the one or more BWPs used to derive the SCREF_SLPRI of the carrier may be at least any one of BWPs listed below.

all BWPs included in the carrier, and/or
  pre-configured BWP, and/or
  BWP to which the UE's service of interest is mapped, and/or
  BWP in which pre-configured other RAT (e.g., dedicated short range communication (DSRC)) is not detected, and/or
  BWP supportable by RF capability of the UE, and/or
  synch reference BWP, and/or
  BWP of a pre-configured numerology (e.g., subcarrier spacing, etc.), and/or
  BWP in which the UE is currently performing a receiving operation, and/or
  BWP in which the UE is currently performing a transmitting operation, and/or
  BWP in which CBR is less than or equal to, or less than, a pre-configured threshold, and/or
  BWP in which CR is less than or equal to, or less than, a pre-configured threshold, for example, BWP in which CR with a margin against CR_LIMIT (maximum limit on occupancy ratio) is less than or equal to, or less than, a pre-configured threshold, and/or
  BWP in which CBR is greater than or equal to, or greater than, a pre-configured threshold, and/or BWP in which CR greater than or equal to, or greater than, a pre-configured threshold, for example, BWP in which CR with a margin against CR_LIMIT is greater than or equal to, or greater than, a pre-configured threshold, and/or BWP in which an SLSS resource is configured, and/or BWP in which SLSS transmission is indicated (in practice)

For example, a network (e.g., a V2X server or a base station) may configure or pre-configure a mapping relation between a BWP and a service with respect to the UE. Therefore, the UE may know a BWP to which the UE's service of interest is mapped.

For example, when a congestion control is applied, the UE may have a relatively small opportunity of performing a transmitting operation on a BWP having a high CBR. Therefore, it may be preferable for the UE to consider a synchronization reference on a BWP having a low CBR (i.e., a BWP having a greater opportunity of performing a transmitting operation), rather than considering a synchronization reference on the BWP having the high CBR. For example, when the congestion control is applied, the UE may have a relatively low opportunity of performing a transmitting operation on a BWP in which a CR with a margin is low or a BWP in which CR_LIMIT is low. Therefore, it may be preferable for the UE to consider a synchronization reference on a BWP in which a CR with a margin is high or a BWP in which CR_LIMIT is high (i.e., a BWP having a greater opportunity of performing a transmitting operation), rather than considering a synchronization reference on a BWP in which a CR with a margin is low or a BWP in which CR_LIMIT is low.

For example, there is a high probability that many UEs are present on a BWP having a high CBR. Therefore, in order to mitigate interference generated due to asynchronous communication between many other UEs, it may be preferable for the UE to consider a synchronization reference on a BWP having a high CBR, rather than considering a synchronization reference on a BWP having a low CBR.

In step S1820, the UE may determine SCREF_SLPRI of the carrier, based on a priority of one or more synchronization references related to one or more BWPs. For example, the UE may independently select a synchronization reference for each of the one or more BWPs. In addition, the UE may determine or consider a priority of any one synchronization reference as the SCREF_SLPRI of the carrier, from among the synchronization references selected for each of one or more BWPs.

For example, from among the synchronization references selected for each of one or more BWPs, a highest priority may be determined or considered as the SCREF_SLPRI value of the carrier. Alternatively, for example, from among the synchronization references selected for each of one or more BWPs, a lowest priority may be determined or considered as the SCREF_SLPRI value of the carrier. For example, when the UE or the network intends to protect a service related to a synchronization reference of a low priority, the lowest priority may be determined or considered as the SCREF_SLPRI value of the carrier. Alternatively, for example, from among the synchronization references selected for each of one or more BWPs, a priority randomly selected from higher M priorities may be determined or considered as the SCREF_SLPRI value of the carrier. Alternatively, for example, from among the synchronization references selected for each of one or more BWPs, a priority randomly selected from lower M priorities may be determined or considered as the SCREF_SLPRI value of the carrier. For example, when the UE determines or considers a priority randomly selected from M priorities as the SCREF_SLPRI value of the carrier, an opportunity of protecting sidelink communication may be (probabilistically) equal between synch clusters formed based on a synchronization reference of a priority which does not differ significantly.

Additionally/alternatively, for example, from among the synchronization references selected for each of one or more BWPs, a highest priority of synchronization references having receive power (e.g., PSBCH DM-RS RSRP) greater than or equal to a pre-configured threshold may be determined or considered as the SCREF_SLPRI value of the carrier. Alternatively, for example, from among the synchronization references selected for each of one or more BWPs, a lowest priority of synchronization references having receive power (e.g., PSBCH DM-RS RSRP) greater than or equal to a pre-configured threshold may be determined or considered as the SCREF_SLPRI value of the carrier. In this case, sidelink communication performed based on a synchronization reference of a relatively low priority can be protected. Alternatively, for example, from among the synchronization references selected for each of one or more BWPs, a priority randomly selected from synchronization references having receive power (e.g., PSBCH DM-RS RSRP) greater than or equal to a pre-configured threshold may be determined or considered as the SCREF_SLPRI value of the carrier. In this case, an opportunity of protecting sidelink communication may be (probabilistically) equally provided between synchronization references having receive power greater than a threshold. Alternatively, for example, from among the synchronization references selected for each of one or more BWPs, a priority of a synchronization reference having greatest receive power (e.g., PSBCH DM-RS RSRP) may be determined or considered as the SCREF_SLPRI value of the carrier.

According to an embodiment of the present disclosure, the UE may perform a transmitting/receiving operation on all BWPs in the carrier, by using a time and/or frequency synchronization derived from a synchronization reference related to the SCREF_SLPRI (by default). Alternatively, the UE may perform the transmitting/receiving operation on a pre-configured BWP, by using the time and/or frequency synchronization derived from the synchronization reference related to the SCREF_SLPRI (by default). In particular, for example, in case of V2X communication based on a single carrier, the UE may perform the transmitting/receiving operation on all BWPs in the carrier or on the pre-configured BWP, by using the time and/or frequency synchronization derived from the synchronization reference related to the SCREF_SLPRI. Herein, for example, when the UE transmits an SLSS and/or a PSBCH on the BWP, it may be configured such that an SLSS ID and an in-coverage indicator and/or out-coverage indicator on the PSBCH conform to a synchronization reference related to SCREF_SLPRI, and other information of the PSBCH (e.g., SL bandwidth, TDD configuration, reserved bit value, etc.) conforms to that of a BWP in which the SLSS and/or the PSBCH are transmitted.

For example, a synchronization reference BWP (hereinafter, a synch reference BWP) may be configured or signaled for the UE. The synch reference BWP may be a BWP for deriving a time and/or frequency synchronization applied to a transmitting/receiving operation on all BWPs in a carrier or a pre-configured BWP. Herein, for example, the synch reference BWP may be independently or differently configured or signaled according to a service type, a service priority, and a new numerology, etc. Herein, for example, a synchronization reference selected on the synch reference BWP may have the same role or meaning as the synchronization reference related to SCREF_SLPRI (described above). For example, a time and/or frequency synchronization of a specific BWP (e.g., synch reference BWP) may be shared (limitedly) only between BWPs to which the same service as the specific BWP is mapped.

According to an embodiment of the present disclosure, the UE may select the SYNCH_REFERCC, based on the SCREF_SLPRI. For example, in a CA situation, the UE may determine the SCREF_SLPRI for each of the plurality of carriers, and the UE may select the SYNCH_REFERCC from among the plurality of carriers, based on the SCREF_SLPRI. For example, in a situation where a first carrier including a plurality of BWPs and a second carrier including a plurality of BWPs are aggregated, the UE may determine SCREF_SLPRI for the first carrier and SCREF_SLPRI for the second carrier. In addition, the UE may select any one carrier as SYNCH_REFERCC, based on the SCREF_SLPRI for the first carrier and the SCREF_SLPRI for the second carrier. For example, when the UE selects SYNCH_REFERCC by using SCREF_SLPRI, the UE may derive a time and/or frequency synchronization of all aggregated carriers and/or BWPs from the synch reference on the SYNCH_REFERCC. Herein, for example, when the UE transmits an SLSS and/or a PSBCH on a carrier and/or a BWP, it may be configured such that an SLSS ID and an in-coverage indicator and/or out-coverage indicator on the PSBCH conform to a synchronization reference related to SYNCH_REFERCC, and other information of the PSBCH (e.g., SL bandwidth, TDD configuration, reserved bit value, etc.) conforms to that of a BWP in which the SLSS and/or the PSBCH are transmitted.

According to an embodiment of the present disclosure, in case of a carrier in which SLSS transmission is configured (e.g., SYNCH_REFERCC, or a carrier belonging to the SET B), the UE may perform SLSS transmission on a BWP (included in the carrier) satisfying some or all of the following conditions. A BWP in which the UE can perform SLSS transmission may include at least any one of BWPs listed below.

BWP having synchronization reference related to SCREF_SLPRI, and/or
BWP used to derive SCREF_SLPRI, and/or
all BWPs included in the carrier, and/or
pre-configured BWP, and/or
synch reference BWP, and/or
BWP to which the UE's service of interest is mapped, and/or
BWP in which pre-configured other RAT (e.g., dedicated short range communication (DSRC)) is not detected, and/or
BWP supportable by RF capability of the UE, and/or
BWP in which the UE is currently performing a receiving operation, and/or
BWP in which the UE is currently performing a transmitting operation, and/or
BWP in which CBR is less than or equal to, or less than, a pre-configured threshold, and/or
BWP in which CR is less than or equal to, or less than, a pre-configured threshold, for example, BWP in which CR with a margin against CR_LIMIT (maximum limit on occupancy ratio) is less than or equal to, or less than, a pre-configured threshold, and/or
BWP in which CBR is greater than or equal to, or greater than, a pre-configured threshold, and/or
BWP in which CR greater than or equal to, or greater than, a pre-configured threshold, for example, BWP in which CR with a margin against CR_LIMIT is greater than or equal to or greater than, or greater than, a pre-configured threshold, and/or
BWP in which an SLSS resource is configured, and/or
BWP in which SLSS transmission is indicated (in practice)

According to an embodiment of the present disclosure, a DFN value, a DFN offset, a location of an SLSS resource, and/or the number of SLSS resources may be configured identically among a plurality of BWPs included in a carrier. Accordingly, for example, V2X communication and/or pool-related logical indices may be matched among the plurality of BWPs. In addition, even if the SLSS resource is configured in the BWP, whether the UE will transmit the SLSS in practice may be additionally configured by the network or may be pre-configured. For example, in order to avoid a latency caused by a BWP switching gap, the SLSS resource and/or the SLSS transmission may always be configured on the BWP. For example, a synch reference priority configuration may be configured identically between the BWPs included in the carrier. For example, the synch reference priority configuration may be a configuration regarding which one will be considered to have a higher priority between eNB/gNB timing and a GNSS.

According to an embodiment of the present disclosure, if a resource location, size, and/or numerology or the like of a BWP related to V2X communication and sidelink synchronization are configured differently, a gap for BWP changing and/or switching may be required. Therefore, in order to reduce the gap for the BWP switching/changing, corresponding BWP configuration information may be exchanged through backhaul signaling between inter-cells or inter-base stations. For example, through the backhaul signaling between the inter-cells or the inter-base stations, the resource location, size, and/or numerology of the BWP related to V2X communication and sidelink synchronization may be changed. Therefore, the resource location, size, and/or numerology of the BWP related to V2X communication and sidelink synchronization may be matched between the inter-cells or the inter-base stations.

According to an embodiment of the present disclosure, the number of symbols constituting the PSBCH and/or the SLSS (and/or a location of the PSBCH and/or the SLSS (e.g., a location in a slot)) may be configured differently for each carrier or for each BWP or for each band. Alternatively, according to a carrier usage, a BWP usage, a band usage, a type of a mapped service, and/or a priority of the mapped service, the number of symbols constituting the PSBCH and/or the SLSS (and/or a location of the PSBCH and/or the SLSS (e.g., a location in a slot)) may be configured differently. Specifically, for example, the number of symbols constituting the PSBCH and/or the SLSS (and/or a location of the PSBCH and/or the SLSS (e.g., a location in a slot)) may be configured differently between a licensed carrier/band in which Uu communication (i.e., communication between a base station and a UE) and SL communication are both possible and an intelligent transportation system (ITS) carrier/band in which only SL communication (for public safety) is possible. For example, since the Uu communication and the SL communication shall co-exist on the licensed carrier/band, the number of symbols constituting the PSBCH and/or the SLSS in the licensed carrier/band may be configured to be relatively smaller than the number of symbols constituting the PSBCH and/or the SLSS in the ITS carrier/band.

Meanwhile, in order to discover a cell or a carrier in an initial cell search process, the UE shall be able to detect a synchronization signal of the cell for all candidate frequencies on a carrier raster in a frequency band to which the cell belongs. The synchronization signal may be transmitted based on one frequency among the candidate frequencies. For example, in WAN (UL/DL) communication, the UE shall perform a blind search for each raster to detect the synchronization signal. In addition, when the UE succeeds in detection of the synchronization signal, the UE may derive a center frequency location of a cell or carrier from a frequency value of a corresponding carrier raster scale.

Figure 19:
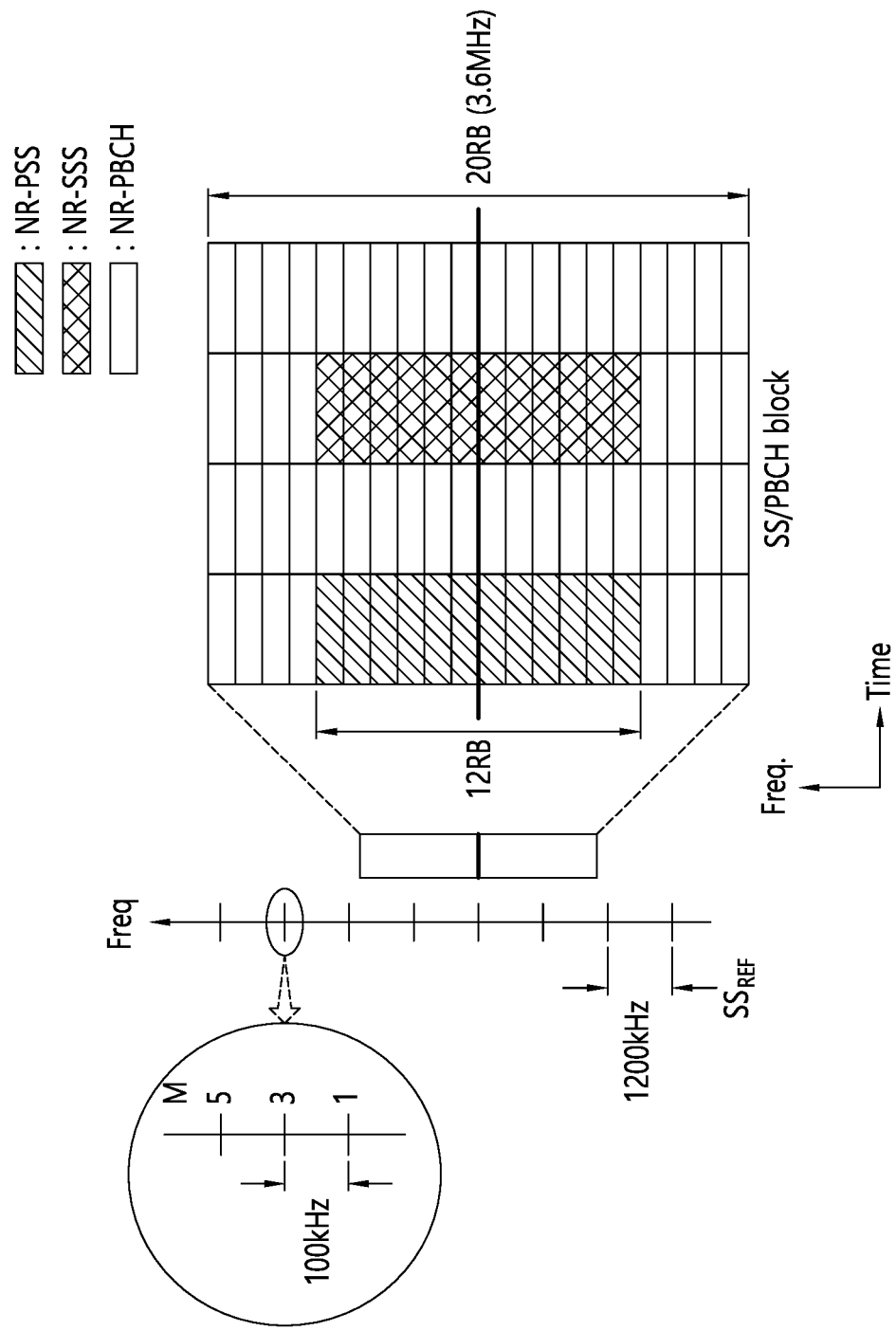
FIG. 19 shows an example of a synchronization raster and numbering.

FIG. 19 shows an example of a synchronization raster and numbering.

The synchronization raster may indicate a frequency location of an SSB that can be used by a UE for system acquisition when there is no explicit signal for an SSB location. An SSB frequency location $SS_{REF}$ and a global synchronization channel number (GSCN) may be related as shown in Table 4.

TABLE 4

For 0-3000 MHz frequency range,
$SS_{REF}$: {N * 1200 KHz + M * 50 KHz} where, M = {1, 3, 5},
GSCN: 3N + (M − 3)/2
For 3000~24250 MHz frequency range,
$SS_{REF}$: {2400 MHZ + N * 1.44 MHz},
GSCN: 7499 + N (7499~22255)
For the 24250~100000 MHz frequency range,
$SS_{REF}$: {24250.08 MHz + N * 17.28 MHz},
GSCN: 22256 + N ([22256 − 26639])

However, as described above, if the UE performs the blind search for each raster, a latency may occur when the UE detects the synchronization signal. In particular, if the UE intends to transmit/receive a service related to a low latency in sidelink communication or V2X communication, a service related to public safety, or a service related to basic safety, a service requirement may not be satisfied due to a latency caused by the blind search for detection of the synchronization signal.

Further, unlike a base station, due to a characteristic of sidelink communication, the UE may not have to transmit the sidelink signal in several bands. In addition, when considering UE capability, it may not be effective for the UE to transmit the sidelink signal in the several bands. Therefore, even if a transmitting UE does not transmit a signal by using a plurality of bands, it may be effective for a receiving UE to perform a blind search for each raster to obtain synchronization.

Therefore, according to an embodiment of the present disclosure, in order to prevent the UE from performing the blind search on a sidelink synchronization signal for each raster, information on a resource on which the sidelink synchronization signal is transmitted may be configured for the UE or may be pre-configured. For example, the information on the resource on which the sidelink synchronization signal is transmitted may include at least any one of information on an SLSS transmission resource location, information on an SLSS transmission frequency resource location, information on a frequency location of an S-SSB, and information on a raster including the S-SSB. For example, the information on the resource on which the sidelink synchronization signal is transmitted may be configured for each BWP or may be pre-configured. For example, the S-SSB may always be included in the BWP for the sidelink. For example, the information on the resource on which the sidelink synchronization signal is transmitted may be configured from the network or may be pre-configured. For example, the information on the resource on which the sidelink synchronization signal is transmitted may be configured from the network to an in-coverage UE. For example, an out-coverage UE may use the information on the resource on which the sidelink synchronization signal is transmitted, which is pre-configured from the network. For example, the network may be a base station. For example, the information on the resource on which the sidelink synchronization signal is transmitted may be indicated by a global synchronization channel number (GSCN) or an absolute radio frequency channel number (ARFCN).

For example, information on a (frequency) resource location related to an S-SSB (e.g., a start (or last) subcarrier (or RB) location of the S-SSB, an S-SSB bandwidth size, etc.) may be signaled in the form of a subcarrier (or RB) offset (and/or a bandwidth length) from a start (or last) subcarrier (or RB) location of an SL BWP (or a resource pool (configured in the SL BWP)) (or (a start (or last) subcarrier of) a pre-configured (SL communication-related) COMMON RB 0 location), or may be signaled in the form of ARFCN information (independent of the SL BWP configuration). Herein, for example, a corresponding rule may also be extendedly applied even when information on a (frequency) resource location related to a resource pool (e.g., a start (or last) subcarrier (or RB) location of the resource pool, a resource pool bandwidth size, etc.) is signaled.

In another example, a (frequency) resource location information related to an SL BWP (e.g., a start (or last) subcarrier (or RB) location of the SL BWP, an SL BWP bandwidth size, etc.) may be signaled in the format of a subcarrier (or RB) offset (and/or a bandwidth length) from a start (or last) subcarrier (or RB) location of an S-SSB (or (a start (or last) subcarrier of) a pre-configured (SL communication-related) COMMON RB 0 location), or may be signaled in the form of ARFCN information (independent of the S-SSB configuration). Herein, for example, a corresponding rule may also be extendedly applied even when information on a (frequency) resource location related to a resource pool (e.g., a start (or last) subcarrier (or RB) location of the resource pool, a resource pool bandwidth size, etc.) is signaled.

In addition, for example, (when the rule is applied,) an S-SSB (frequency) resource may be located with limitation (without limitation) within an SL BWP (or resource pool)-related (frequency) resource region. In another example, (when the rule is applied,) an S-SSB-related PRB (or subcarrier) GRID (location) may be configured to be (always) matched (or not matched) to an SL BWP (or a source pool or pre-configured (SL communication-related) COMMONO RB)-related PRB (or subcarrier) GRID (location).

Figure 20:
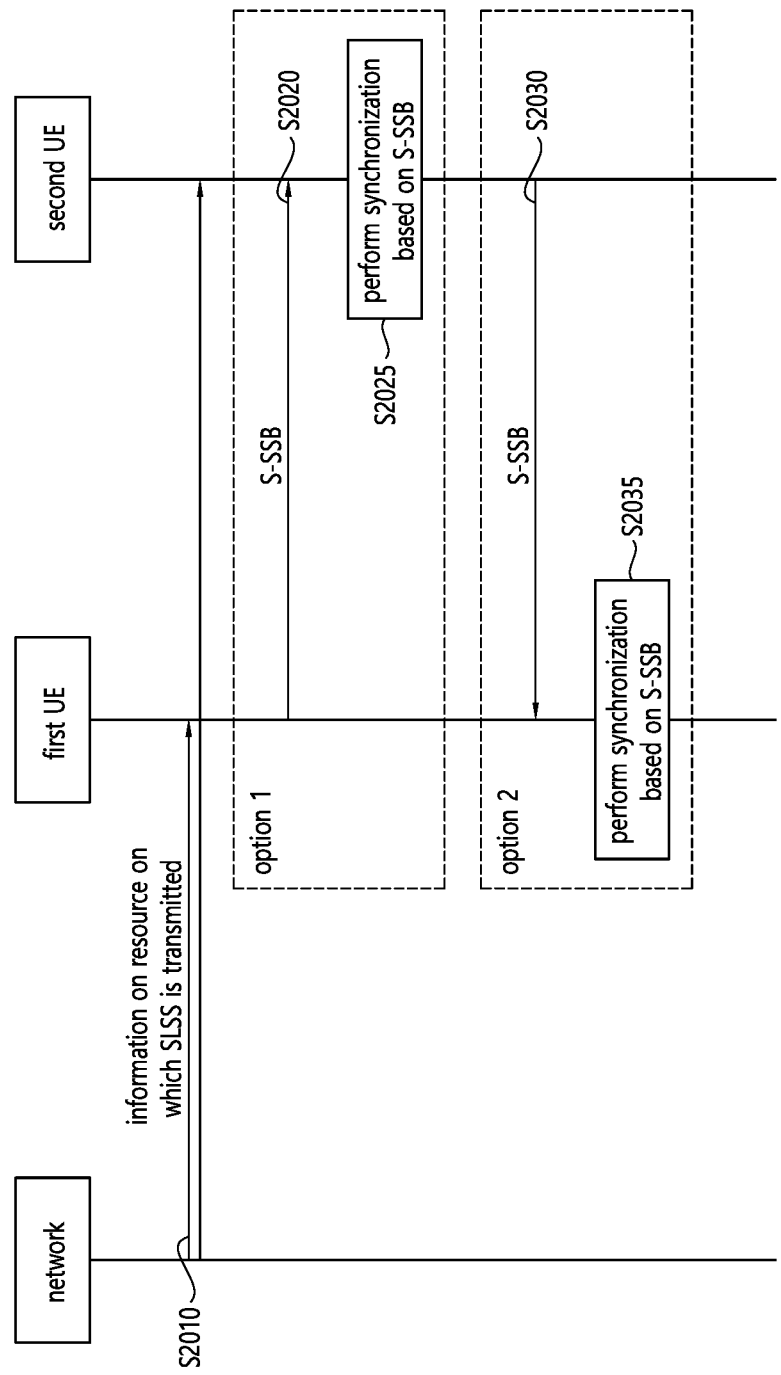
FIG. 20 shows an example in which a UE performs synchronization based on information on a resource on which a sidelink synchronization signal is transmitted, according to an embodiment of the present disclosure.

FIG. 20 shows an example in which a UE performs synchronization based on information on a resource on which a sidelink synchronization signal is transmitted, according to an embodiment of the present disclosure.

Referring to FIG. 20, in step S2010, a first UE and a second UE may receive, from a network, the information on the resource on which the sidelink synchronization signal is transmitted. When the first UE and the second UE are in an in-coverage state, the network may configure the information on the resource, on which the sidelink synchronization signal is transmitted, to the first UE and the second UE. When the first UE and the second UE is in an out-coverage state, the first UE and the second UE may use the information on the resource on which the sidelink synchronization signal received in the in-coverage state is transmitted, for a synchronization operation.

In case of an option 1, in step S2020, the first UE may transmit an S-SSB on a frequency resource location related to a configured or pre-configured S-SSB. When a plurality of BWPs are configured for the first UE, the first UE may transmit the S-SSB on a frequency resource location related to a configured or pre-configured S-SSB for each of a plurality of BWPs. In step S2025, when the second UE receives the S-SSB, the second UE may perform synchronization based on the S-SSB. Additionally, the second UE may relay the S-SSB to another UE.

In case of an option 2, the second UE may not be able to detect the S-SSB on the frequency resource location related to the configured or pre-configured S-SSB. In this case, in step S2030, the second UE may transmit the S-SSB on the frequency resource location related to the configured or pre-configured S-SSB. When a plurality of BWPs are configured for the second UE, the second UE may transmit the S-SSB on the frequency resource location related to the configured or pre-configured S-SSB for each of the plurality of BWPs. In step S2035, when the first UE receives the S-SSB, the first UE may perform synchronization based on the S-SSB. Additionally, the first UE may relay the S-SSB to another UE.

According to an embodiment of the present disclosure, the UE does not have to perform the blind search to detect the S-SSB. Therefore, a latency caused by the blind search may not occur. For example, for a carrier in a given band, there may be no intended hypotheses detection at a frequency location of the S-SSB performed by the UE. For example, a potential frequency location for a pre-configured or configured frequency location may be limited. According to an embodiment of the present disclosure, if the information on the resource on which the sidelink synchronization signal is transmitted is configured for the UE or preconfigured, a receiving UE may rapidly detect the synchronization signal without the blind search, and a transmitting UE may transmit the synchronization signal on the configured frequency location. Therefore, the UE may effective transmit/receive a service related to a low latency in sidelink communication or V2X communication, a service related to public safety, or a service related to basic safety.

Herein, for example, the information on the resource on which the sidelink synchronization signal is transmitted may be independently or configured differently for each service type, service priority, or band. Herein, for example, the raster location related to the SLSS for sidelink communication may be configured to be different from a raster location related to a synchronization signal for WAN (UL/DL) communication between the base station and the UE. For example, the raster location related to the SLS for sidelink communication may be pre-configured to be different from the raster location related to the synchronization signal for WAN (UL/DL) communication between the base station and the UE. For example, in case of out-coverage, the raster location related to the SLSS for sidelink communication or the SLSS transmission resource location may be configured (fixedly) as one location. For example, in case of in-coverage, the raster location related to the SLSS for sidelink communication may be pre-configured to be different from the raster location related to the synchronization signal for WAN (UL/DL) communication between the base station and the UE. For example, according to whether the UE is in the in-coverage or out-coverage state, a configuration related to the SLSS may be different.

Figure 21:
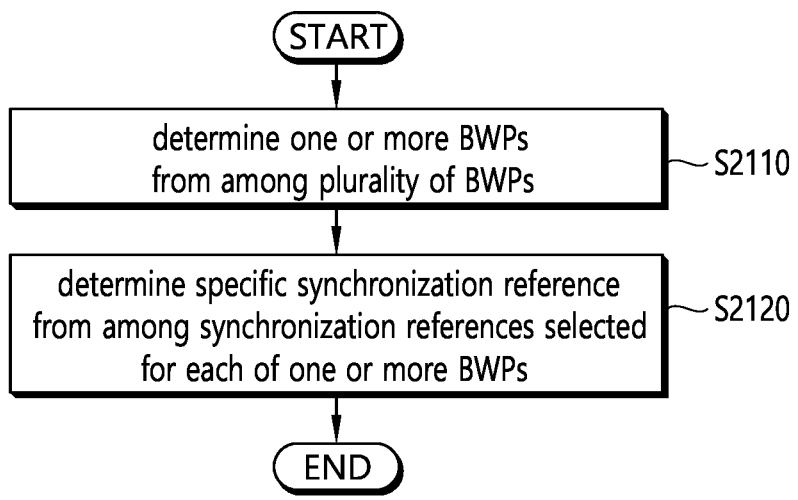
FIG. 21 shows a method in which a UE performs synchronization, based on a specific synchronization reference selected from synchronization references related to a plurality of BWPs, according to an embodiment of the present disclosure.

FIG. 21 shows a method in which a UE performs synchronization, based on a specific synchronization reference selected from synchronization references related to a plurality of BWPs, according to an embodiment of the present disclosure.

According to an embodiment of the present disclosure, without distinction of a carrier, the UE may select a synchronization reference, from among synchronization references selected independently for each BWP. The synchronization reference may be a synchronization reference in which a time and/or frequency synchronization applied to a transmitting/receiving operation of all BWPs or a pre-configured BWP is derived.

Referring to FIG. 21, in step S2110, the UE may determine or select one or more BWPs from among a plurality of BWPs. For example, without distinction of a carrier, the UE may determine or select one or more BWPs from among the plurality of BWPs. For example, one or more BWPs determined or selected from among the plurality of BWPs may be at least any one of BWPs listed below.

all BWPs, and/or
pre-configured BWP, and/or
BWP to which the UE's service of interest is mapped, and/or
BWP in which pre-configured other RAT (e.g., dedicated short range communication (DSRC)) is not detected, and/or
BWP supportable by RF capability of the UE, and/or
synch reference BWP, and/or
BWP of a pre-configured numerology (e.g., subcarrier spacing, etc.), and/or
BWP in which the UE is currently performing a receiving operation, and/or
BWP in which the UE is currently performing a transmitting operation, and/or
BWP in which CBR is less than or equal to, or less than, a pre-configured threshold, and/or
BWP in which CR is less than or equal to, or less than, a pre-configured threshold, for example, BWP in which CR with a margin against CR_LIMIT (maximum limit on occupancy ratio) is less than or equal to or less than, or less than, a pre-configured threshold, and/or
BWP in which CBR is greater than or equal to, or greater than, a pre-configured threshold, and/or
BWP in which CR greater than or equal to, or greater than, a pre-configured threshold, for example, BWP in which CR with a margin against CR_LIMIT is greater than or equal to, or greater than, a pre-configured threshold, and/or
BWP in which an SLSS resource is configured, and/or
BWP in which SLSS transmission is indicated (in practice)

For example, a network (e.g., a V2X server or a base station) may configure or pre-configure a mapping relation between a BWP and a service with respect to the UE. Therefore, the UE may know a BWP to which the UE's service of interest is mapped.

In step S2120, the UE may independently select a synchronization reference for each of one or more BWPs. In addition, the UE may determine a specific synchronization reference, from among the synchronization references selected for each of the one or more BWPs. In addition, the UE may perform a transmitting/receiving operation on all BWPs or a pre-configured BWP by using a time and/or frequency synchronization derived from the specific synchronization reference.

For example, a synchronization reference having a highest priority among synchronization references selected from each of one or more of BWPs may be determined as the specific synchronization reference. Alternatively, for example, a synchronization reference having a lowest priority among the synchronization references selected from each of one or more of BWPs may be determined as the specific synchronization reference. Alternatively, for example, from among the synchronization references selected from each of one or more of BWPs, a synchronization reference randomly selected from synchronization references having higher M priorities may be determined as the specific synchronization reference. Alternatively, for example, from among the synchronization references selected from each of one or more of BWPs, a synchronization reference randomly selected from synchronization references having lower M priorities may be determined as the specific synchronization reference.

Additionally/alternatively, for example, from among the synchronization references selected for each of one or more BWPs, a synchronization reference having receive power (e.g., PSBCH DM-RS RSRP) greater than or equal to a pre-configured threshold may be determined as the specific synchronization reference. Alternatively, for example, from among the synchronization references selected for each of one or more BWPs, a synchronization reference having a lowest priority among the synchronization references having receive power (e.g., PSBCH DM-RS RSRP) greater than or equal to the pre-configured threshold may be determined as the specific synchronization reference. Alternatively, for example, from among the synchronization references selected for each of one or more BWPs, a synchronization reference randomly selected from synchronization references having receive power (e.g., PSBCH DM-RS RSRP) greater than or equal to a pre-configured threshold may be determined as the specific synchronization reference. Alternatively, for example, from among the synchronization references selected for each of one or more BWPs, a synchronization reference having greatest receive power (e.g., PSBCH DM-RS RSRP) may be determined as the specific synchronization reference.

According to an embodiment of FIG. 21, the UE may select a synchronization reference on a BWP basis, instead of (conventionally) selecting the synchronization reference on a carrier basis.

Figure 22:
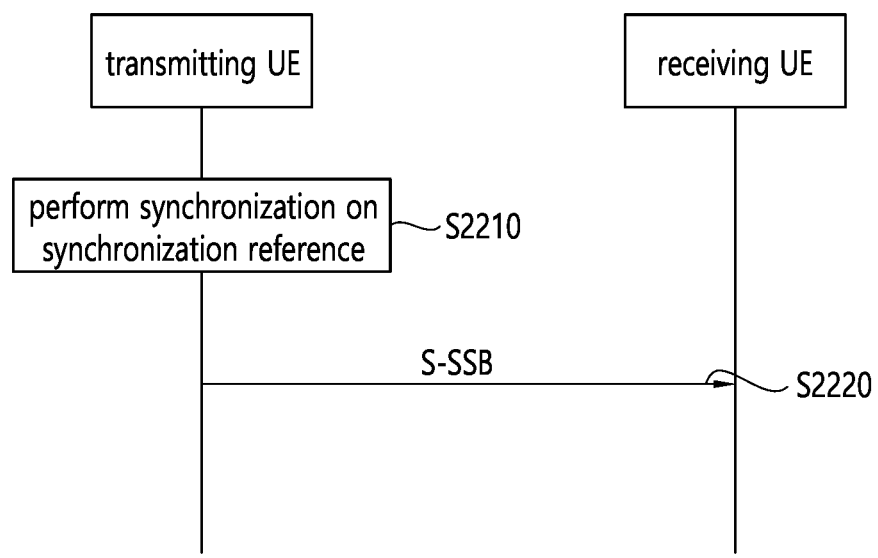
FIG. 22 shows a procedure of transmitting/receiving sidelink information by a UE which has performed synchronization, according to an embodiment.

FIG. 22 shows a procedure of transmitting/receiving sidelink information by a UE which has performed synchronization, according to an embodiment.

Referring to FIG. 22, in step S2210, a transmitting UE may perform synchronization for a synchronization reference. When one carrier includes a plurality of BWPs or when a plurality of carriers include a plurality of BWPs, the transmitting UE may select a synchronization reference according to at least any one method proposed through an embodiment of FIG. 18 to FIG. 21, and may perform synchronization for the synchronization reference. Accordingly, the transmitting UE may perform a transmitting operation on all BWPs or a pre-configured BWP by using a time and/or frequency synchronization derived from the synchronization reference. For example, the transmitting UE may transmit an S-SSB on all BWPs or a pre-configured BWP by using a time and/or frequency synchronization derived from the synchronization reference.

In step S2220, a receiving UE may perform synchronization, based on the S-SSB. For example, the receiving UE may perform sidelink communication with the transmitting UE by using a time and/or frequency synchronization derived based on the S-SSB. Alternatively, if the receiving UE fails to detect the S-SSB from the transmitting UE, the receiving UE may select a synchronization reference according to at least any one method proposed through an embodiment of FIG. 18 to FIG. 21, and may perform synchronization for the synchronization reference.

Figure 23:
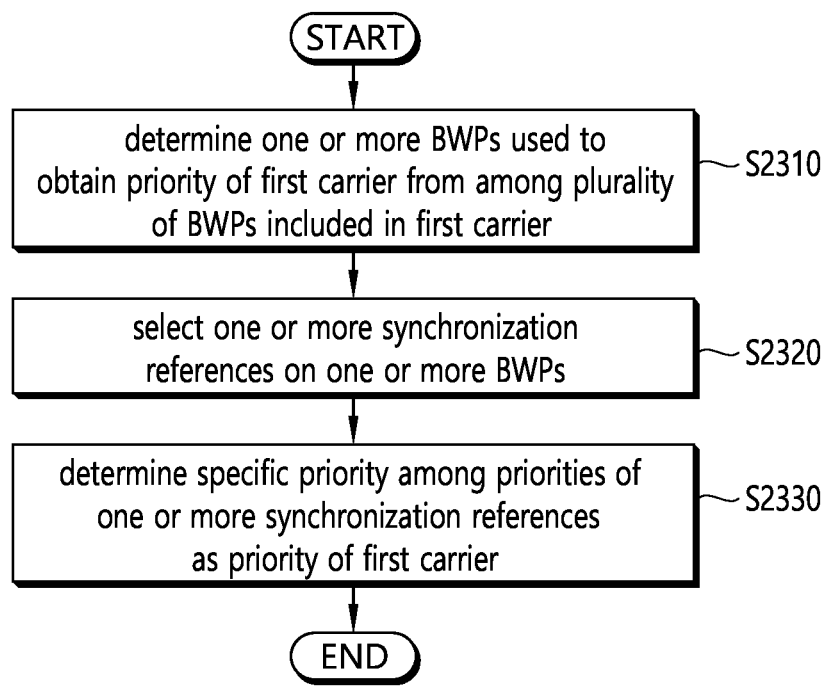
FIG. 23 shows a method in which a first device 100 performs sidelink communication, according to an embodiment of the present disclosure.

FIG. 23 shows a method in which the first device 100 performs sidelink communication, according to an embodiment of the present disclosure.

Referring to FIG. 23, in step S2310, the first device 100 may determine one or more bandwidth parts (BWPs) used to obtain a priority of a first carrier, from among a plurality of BWPs included in the first carrier. For example, the one or more BWPs may be the plurality of BWPs included in the first carrier. For example, the one or more BWPs may be pre-configured BWPs among the plurality of BWPs. For example, the one or more BWPs may be BWPs to which a service of interest of the first device 100 is mapped among the plurality of BWPs. For example, the one or more BWPs may be determined by various methods proposed in the present specification. For example, a direct frame number (DFN) value, DFN offset, a location of a sidelink synchronization signal (SLSS) resource, or the number of SLSS resources may be configured identically. Additionally, the first device 100 may receive a configuration regarding whether SLSS transmission is performed on the SLSS resource. For example, information for whether SLSS transmission is performed in practice on the SLSS resource is configured or pre-configured in the first device 100.

In step S2320, the first device 100 may select one or more synchronization references on the one or more BWPs.

In step S2330, the first device 100 may determine a specific priority as the priority of the first carrier among priorities of the one or more synchronization references. For example, the specific priority may be a highest priority among the priorities of the one or more synchronization references. Additionally, the first device may measure receive power for the one or more synchronization references. In this case, the specific priority may be a priority of a synchronization reference having a highest priority among the synchronization references of which the receive power is greater than or equal to a threshold. For example, the priority of the first carrier may be determined by various methods proposed in the present specification.

Additionally, the first device 100 may obtain a synchronization for time or frequency from synchronization references related to the specific priority. Additionally, the first device 100 may perform sidelink communication with the second device 200 through the plurality of BWPs included in the first carrier, based on the synchronization for the time or frequency.

Additionally, the first device 100 may obtain the synchronization for the time or frequency from the synchronization reference selected on the synch reference BWPs determined for the first device 100, from among the plurality of BWPs included in the first carrier.

Additionally, the first device 100 may determine a priority of a second carrier including a plurality of BWPs. Additionally, the first device 100 may select a carrier of a highest priority between the priority of the first carrier and the priority of the second carrier. Additionally, the first device 100 may obtain the synchronization for the time or frequency for the first carrier and second carrier from a synchronization reference related to the carrier having the highest priority.

Additionally, the first device 100 may receive information on a resource for transmitting a sidelink synchronization signal, from a network.

The first device 100 may include at least any one of a transmitting UE, a receiving UE, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a laptop computer, a digital broadcasting UE, a tablet PC, a smartphone, a wearable device, a hologram device, a public safety device, an MTC device, an IoT device, a medical device, a FinTech device, a security device, and an environment device.

The proposed method may be performed by various devices described in the present specification. First, the processor 102 of the first device 100 may determine one or more bandwidth parts (BWPs) used to obtain a priority of a first carrier, from among a plurality of BWPs included in the first carrier. In addition, the processor 102 of the first device 100 may select one or more synchronization references on the one or more BWPs. In addition, the processor 102 of the first device 100 may determine a specific priority as the priority of the first carrier among priorities of the one or more synchronization references.//

Examples for the aforementioned proposed scheme can be included as one of implementation methods of the present disclosure, and thus can be apparently regarded as a sort of proposed methods. In addition, although the aforementioned proposed schemes can be independently implemented, it is also possible to be implemented by combining (or merging) some proposed schemes. For example, although the proposed method is described in the present disclosure based on the 3GPP system for convenience of explanation, a scope of a system for applying the proposed method may be extended to other systems other than the 3GPP system.

Hereinafter, an apparatus to which the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
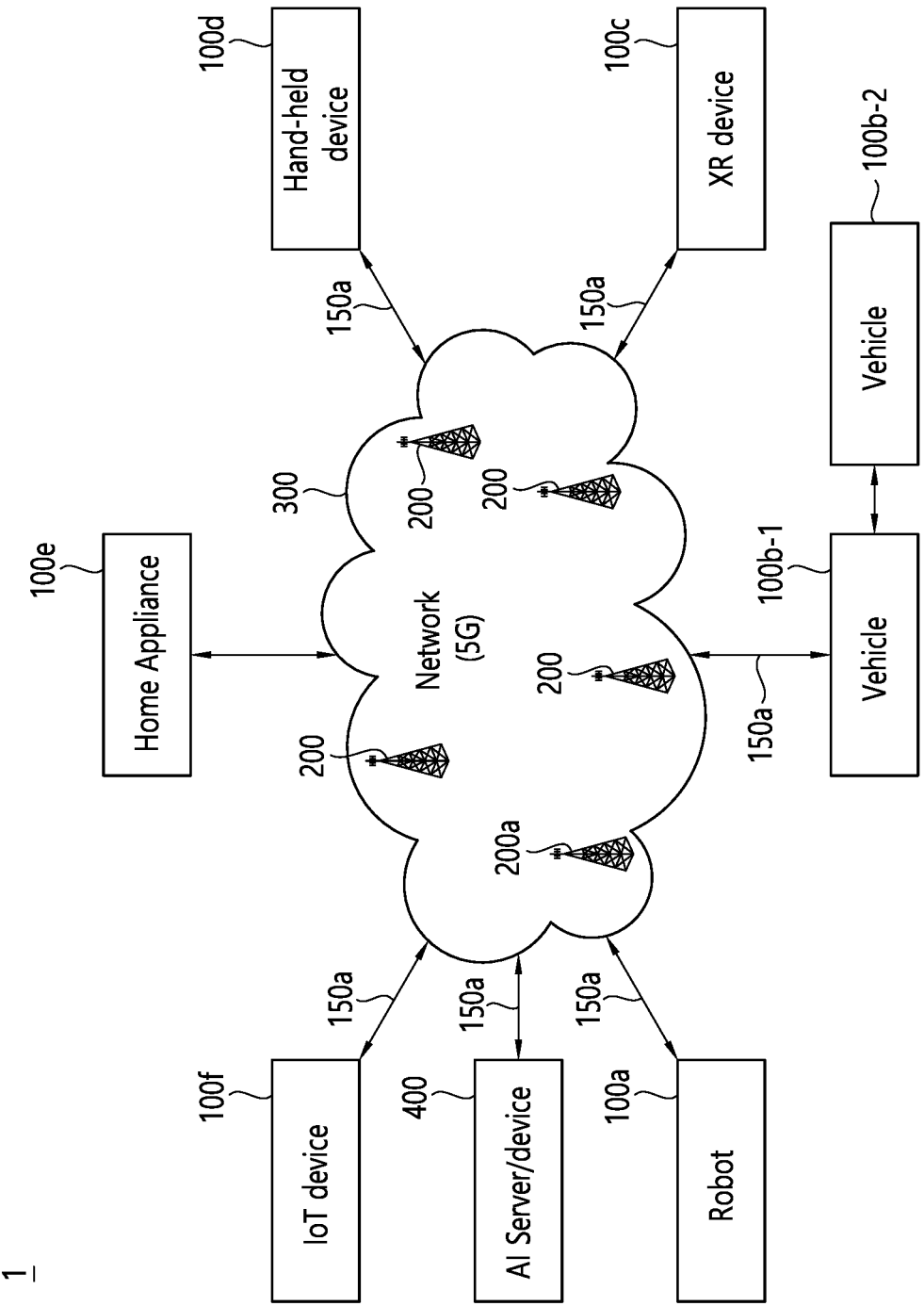
FIG. 24 shows a communication system (1) applied to the present disclosure.

FIG. 24 shows a communication system (1) applied to the present disclosure.

Referring to FIG. 24, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b) may be established between the wireless devices (100a-100f)/BS (200), or BS (200)/wireless devices (100a-100f). Herein, the wireless communication/connections (150a, 150b) may be established through various RATs (e.g., 5G NR) such as uplink/downlink communication (150a), sidelink communication (150b) (or, D2D communication), or inter BS communication (e.g., relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 25:
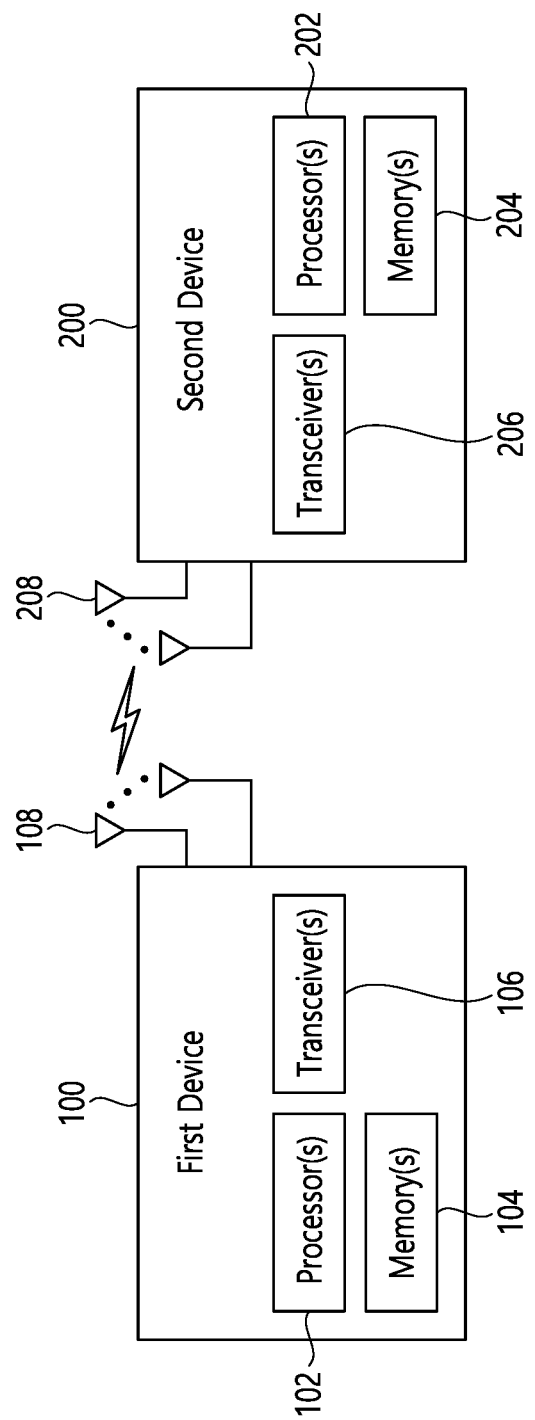
FIG. 25 shows wireless devices applicable to the present disclosure.

FIG. 25 shows wireless devices applicable to the present disclosure.

Referring to FIG. 25, a first wireless device (100) and a second wireless device (200) may transmit radio signals through a variety of RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 24.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Units (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and acquire the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 26:
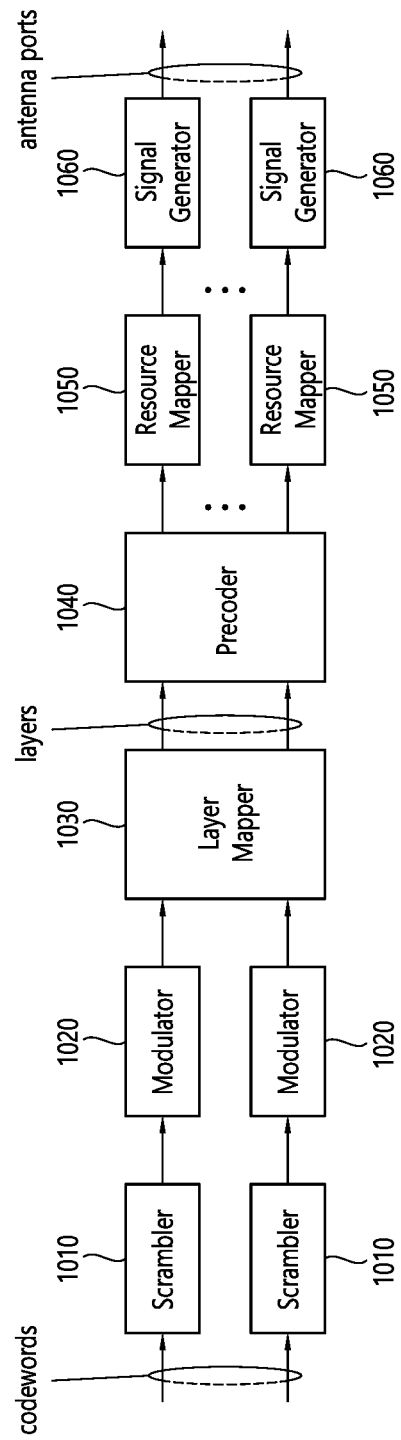
FIG. 26 shows a signal process circuit for a transmission signal.

FIG. 26 shows a signal process circuit for a transmission signal.

Referring to FIG. 26, a signal processing circuit (1000) may include scramblers (1010), modulators (1020), a layer mapper (1030), a precoder (1040), resource mappers (1050), and signal generators (1060). An operation/function of FIG. 26 may be performed, without being limited to, the processors (102, 202) and/or the transceivers (106, 206) of FIG. 25. Hardware elements of FIG. 26 may be implemented by the processors (102, 202) and/or the transceivers (106, 206) of FIG. 25. For example, blocks 1010-1060 may be implemented by the processors (102, 202) of FIG. 25. Alternatively, the blocks 1010 to 1050 may be implemented by the processors (102, 202) of FIG. 25 and the block 1060 may be implemented by the transceivers (106, 206) of FIG. 25.

Codewords may be converted into radio signals via the signal processing circuit (1000) of FIG. 26. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010-1060) of FIG. 26. For example, the wireless devices (e.g., 100, 200 of FIG. 25) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 27:
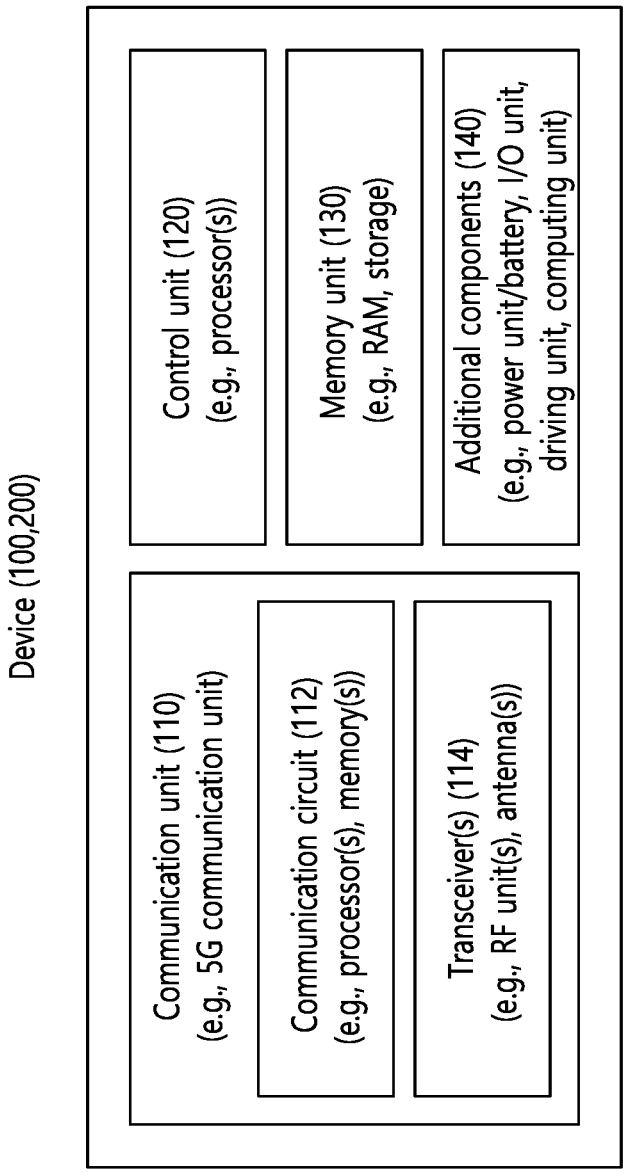
FIG. 27 shows another example of a wireless device applied to the present disclosure.

FIG. 27 shows another example of a wireless device applied to the present disclosure. The wireless device may be implemented in various forms according to a use-case/service (refer to FIG. 24 and FIGS. 26 to 31).

Referring to FIG. 27, wireless devices (100, 200) may correspond to the wireless devices (100, 200) of FIG. 25 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 25. For example, the transceiver(s) (114) may include the one or more transceivers (106, 206) and/or the one or more antennas (108, 208) of FIG. 25. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 24), the vehicles (100*b*-1, 100*b*-2 of FIG. 24), the XR device (100*c* of FIG. 24), the hand-held device (100*d* of FIG. 24), the home appliance (100*e* of FIG. 24), the IoT device (100*f* of FIG. 24), a digital broadcast terminal, a hologram device, a public safety device, an MTC device, a medicine device, a fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 27, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 27 will be described in detail with reference to the drawings.

Figure 28:
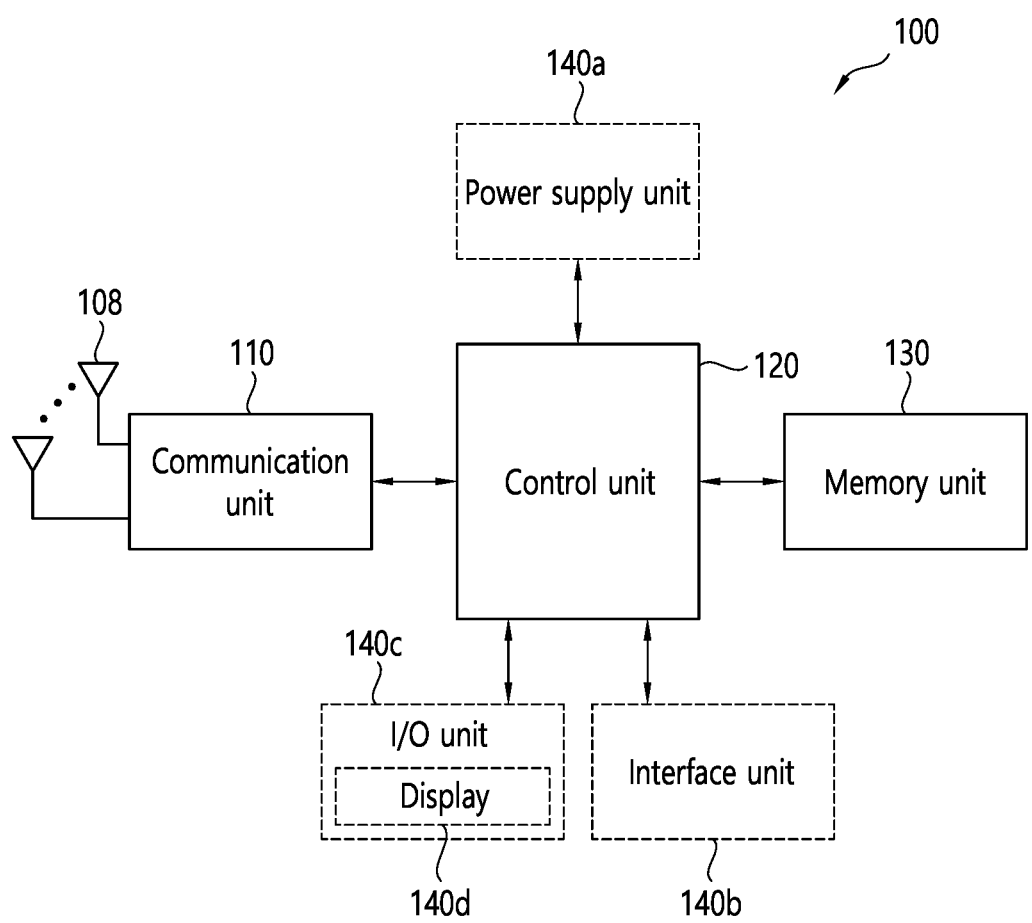
FIG. 28 shows a hand-held device applied to the present disclosure.

FIG. 28 shows a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device (100) may include an antenna unit (108), a communication unit (110), a control unit (120), a memory unit (130), a power supply unit (140*a*), an interface unit (140*b*), and an I/O unit (140*c*). The antenna unit (108) may be configured as a part of the communication unit (110). Blocks 110-130/140*a*-140*c* correspond to the blocks 110-130/140 of FIG. 27, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140*a*) may supply power to the hand-held device (100) and include a wired/wireless charging circuit, a battery, etc. The interface unit (140*b*) may support connection of the hand-held device (100) to other external devices. The interface unit (140*b*) may include various ports (e.g., an audio I/O port and a video I/O port) for connection with external devices. The I/O unit (140*c*) may input or output video information/signals, audio information/signals, data, and/or information input by a user. The I/O unit (140*c*) may include a camera, a microphone, a user input unit, a display unit (140*d*), a speaker, and/or a haptic module.

As an example, in the case of data communication, the I/O unit (140*c*) may acquire information/signals (e.g., touch, text, voice, images, or video) input by a user and the acquired information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140*c*).

Figure 29:
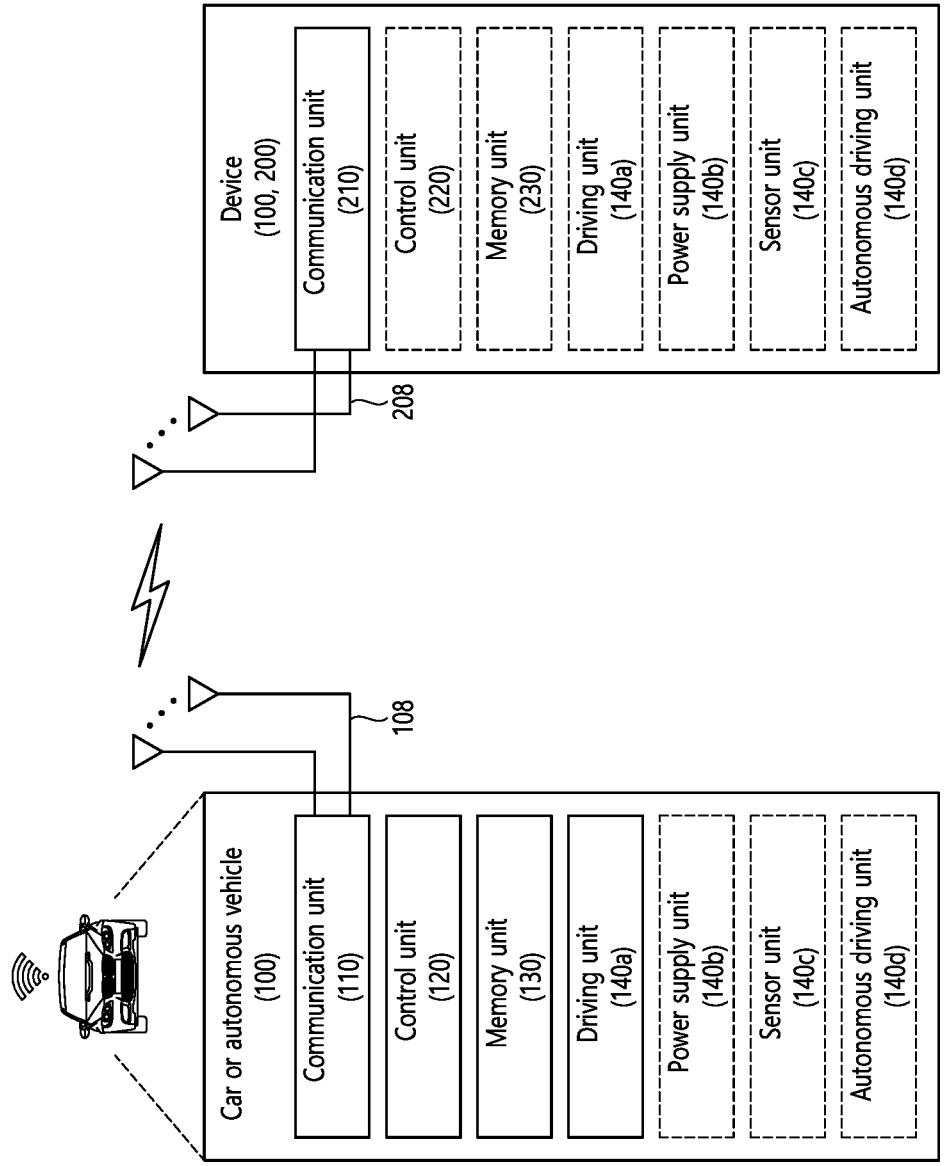
FIG. 29 shows a vehicle or an autonomous driving vehicle applied to the present disclosure.

FIG. 29 shows a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 27, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous driving vehicle (100). The control unit (120) may include an Electronic Control Unit (ECU). The driving unit (140*a*) may cause the vehicle or the autonomous driving vehicle (100) to drive on a road. The driving unit (140*a*) may include an engine, a motor, a powertrain, a wheel, a brake, a steering device, etc. The power supply unit (140*b*) may supply power to the vehicle or the autonomous driving vehicle (100) and include a wired/wireless charging circuit, a battery, etc. The sensor unit (140*c*) may acquire a vehicle state, ambient environment information, user information, etc. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140*d*) may generate an autonomous driving path and a driving plan from the obtained data. The control unit (120) may control the driving unit (140*a*) such that the vehicle or the autonomous driving vehicle (100) may move along the autonomous driving path according to the driving plan (e.g., speed/direction control). In the middle of autonomous driving, the communication unit (110) may aperiodically/periodically acquire recent traffic information data from the external server and acquire surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 30:
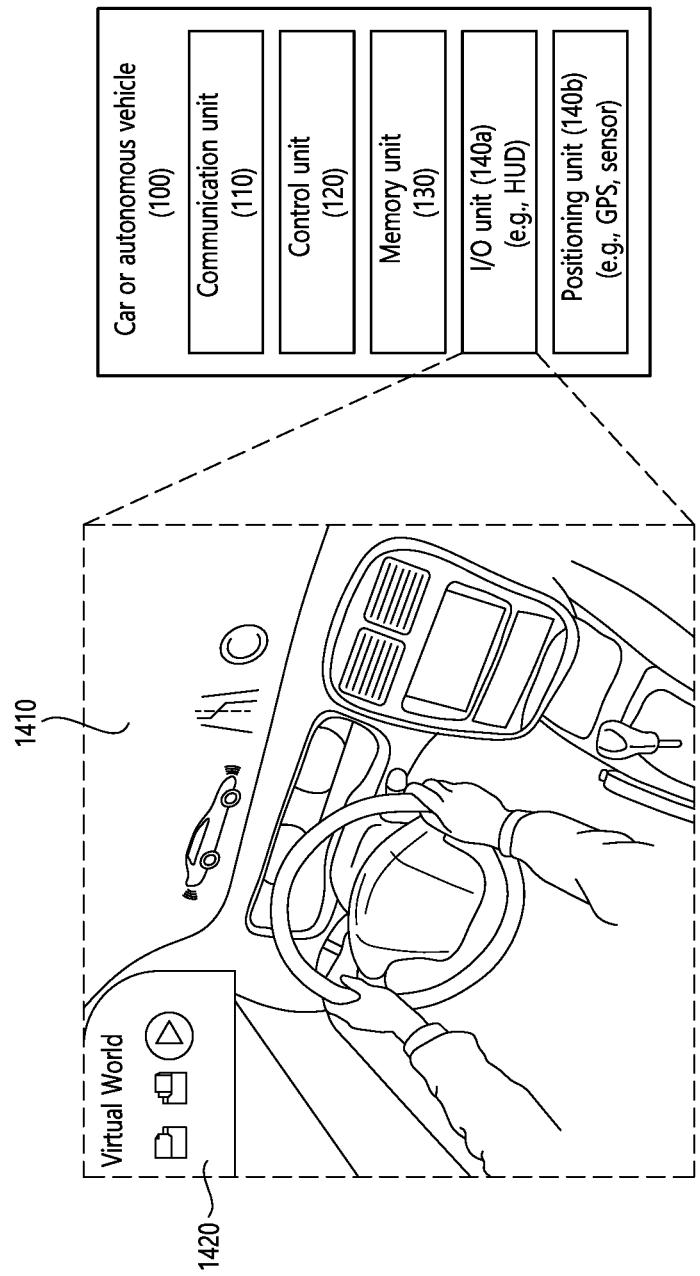
FIG. 30 shows a vehicle applied to the present disclosure.

FIG. 30 shows a vehicle applied to the present disclosure. The vehicle may be implemented as a transport means, an aerial vehicle, a ship, etc.

Referring to FIG. 30, a vehicle (100) may include a communication unit (110), a control unit (120), a memory unit (130), an I/O unit (140*a*), and a positioning unit (140*b*). Herein, the blocks 110 to 130/140*a*~140*b* correspond to blocks 110 to 130/140 of FIG. 27.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include a HUD. The positioning unit (140*b*) may acquire information about the position of the vehicle (100). The position information may include information about an absolute position of the vehicle (100), information about the position of the vehicle (100) within a traveling lane, acceleration information, and information about the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information about driving/vehicle abnormality to related organizations.

Figure 31:
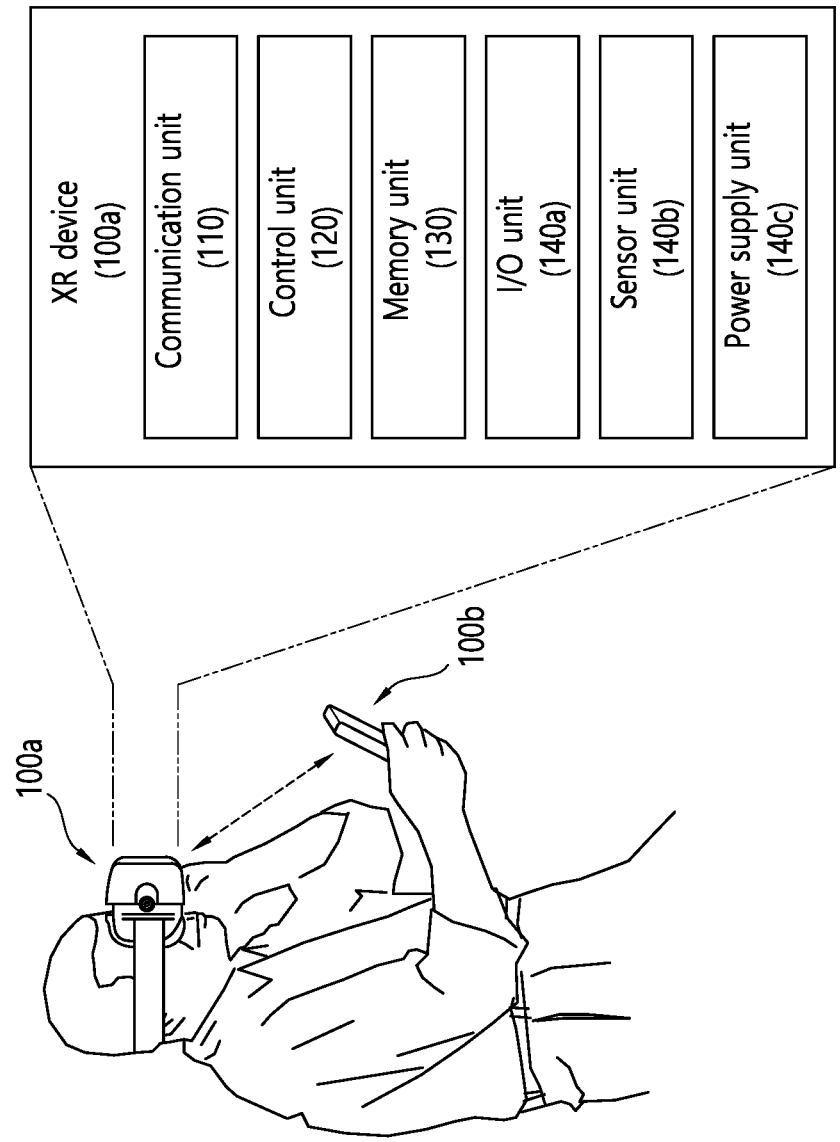
FIG. 31 shows an XR device applied to the present disclosure.

FIG. 31 shows an XR device applied to the present disclosure. The XR device may be implemented by an HMD, a HUD mounted in a vehicle, a television, a smartphone, a computer, a wearable device, a home appliance, a digital signage, a vehicle, a robot, etc.

Referring to FIG. 31, an XR device (100*a*) may include a communication unit (110), a control unit (120), a memory unit (130), an I/O unit (140*a*), a sensor unit (140*b*), and a power supply unit (140*c*). Herein, the blocks 110 to 130/140*a*-140*c* correspond to the blocks 110 to 130/140 of FIG. 27, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100*a*). For example, the control unit (120) may be configured to control and/or perform procedures such as video/image acquisition, (video/image) encoding, and metadata generation and processing. The memory unit (130) may store data/parameters/programs/code/commands needed to drive the XR device (100*a*)/generate XR object. The I/O unit (140*a*) may obtain control information and data from the exterior and output the generated XR object. The I/O unit (140*a*) may include a camera, a microphone, a user input unit, a display unit, a speaker, and/or a haptic module. The sensor unit (140*b*) may obtain an XR device state, surrounding environment information, user information, etc. The sensor unit (140*b*) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140*c*) may supply power to the XR device (100*a*) and include a wired/wireless charging circuit, a battery, etc.

For example, the memory unit (130) of the XR device (100*a*) may include information (e.g., data) needed to generate the XR object (e.g., an AR/VR/MR object). The I/O unit (140*a*) may receive a command for manipulating the XR device (100*a*) from a user and the control unit (120) may drive the XR device (100*a*) according to a driving command of a user. For example, when a user desires to watch a film or news through the XR device (100*a*), the control unit (120) transmits content request information to another device (e.g., a hand-held device (100*b*)) or a media server through the communication unit (130). The communication unit (130) may download/stream content such as films or news from another device (e.g., the hand-held device (100*b*)) or the media server to the memory unit (130). The control unit (120) may control and/or perform procedures such as video/image acquisition, (video/image) encoding, and metadata generation/processing with respect to the content and generate/output the XR object based on information about a surrounding space or a real object obtained through the I/O unit (140*a*)/sensor unit (140*b*).

The XR device (100*a*) may be wirelessly connected to the hand-held device (100*b*) through the communication unit (110) and the operation of the XR device (100a) may be controlled by the hand-held device (100b). For example, the hand-held device (100b) may operate as a controller of the XR device (100a). To this end, the XR device (100a) may obtain information about a 3D position of the hand-held device (100b) and generate and output an XR object corresponding to the hand-held device (100b).

Figure 32:
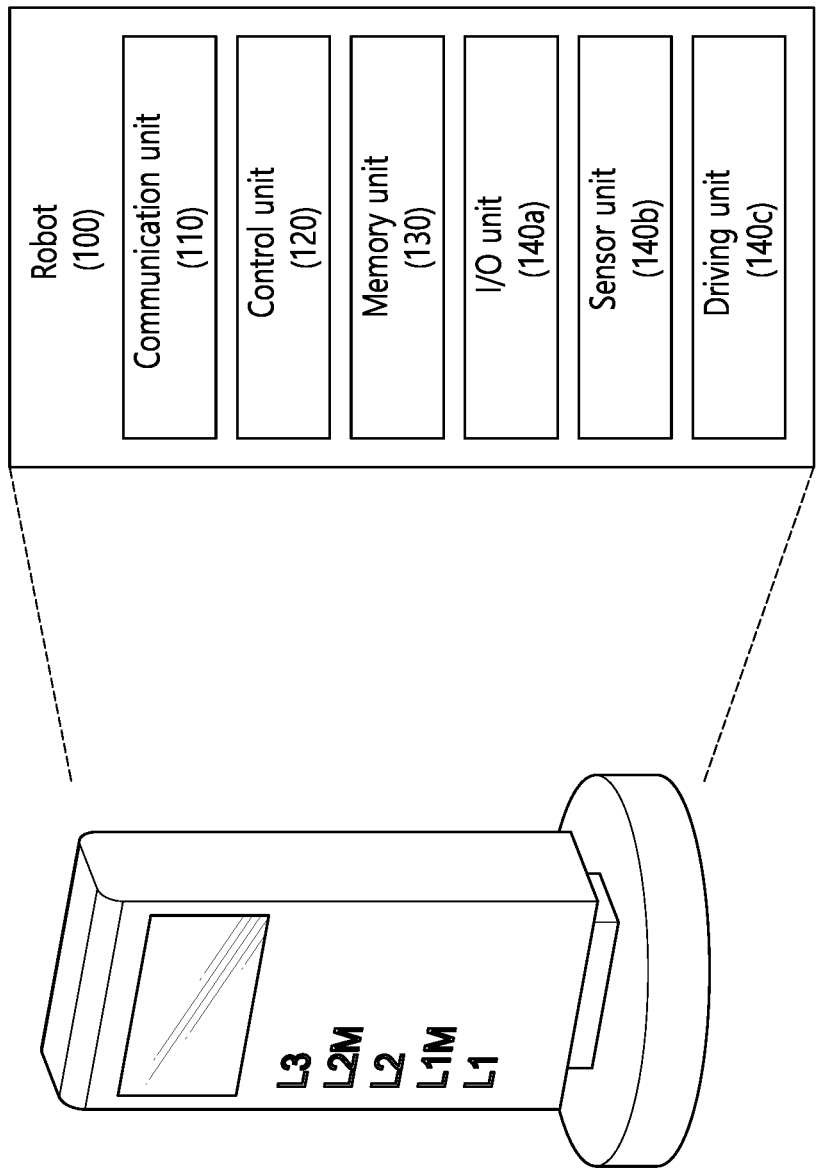
FIG. 32 shows a robot applied to the present disclosure.

FIG. 32 shows a robot applied to the present disclosure. The robot may be categorized into an industrial robot, a medical robot, a household robot, a military robot, etc., according to a used purpose or field.

Referring to FIG. 32, a robot (100) may include a communication unit (110), a control unit (120), a memory unit (130), an I/O unit (140a), a sensor unit (140b), and a driving unit (140c). Herein, the blocks 110 to 130/140a~140c correspond to the blocks 110 to 130/140 of FIG. 27, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 33:
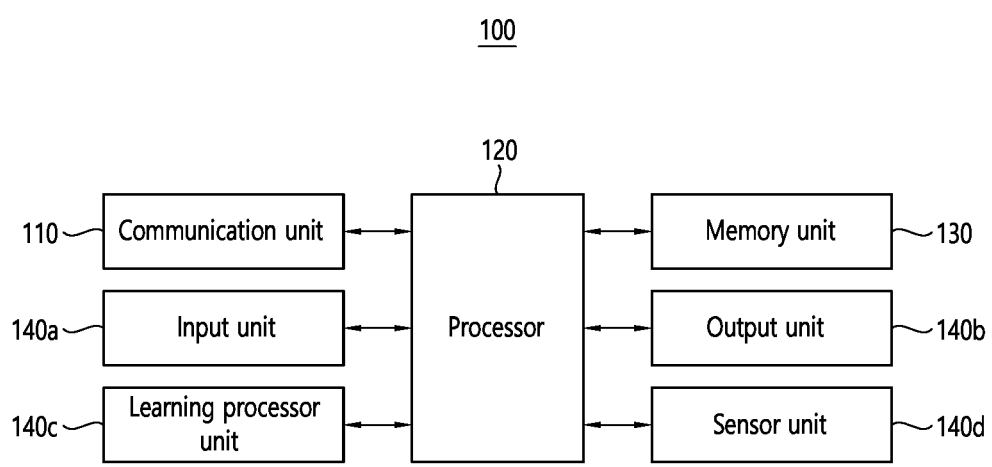
FIG. 33 shows an AI device applied to the present disclosure.

FIG. 33 shows an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 33, an AI device (100) may include a communication unit (110), a control unit (120), a memory unit (130), an I/O unit (140a/140b), a learning processor unit (140c), and a sensor unit (140d). The blocks 110 to 130/140a~140d correspond to blocks 110 to 130/140 of FIG. 27, respectively.

The communication unit (110) may transmit and receive wired/radio signals (e.g., sensor information, user input, learning models, or control signals) to and from external devices such as other AI devices (e.g., 100x, 200, 400 of FIG. 24) or an AI server (200) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 24). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may acquire various types of data from the exterior of the AI device (100). For example, the input unit (140a) may acquire learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 24). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for performing, by a first apparatus, sidelink (SL) communication, the method comprising:
receiving, from a base station, information related to a first SL bandwidth part (BWP);
receiving, from the base station, information related to frequency location of a SL synchronization signal, wherein the frequency location of the SL synchronization signal is within the first SL BWP; and
receiving, from a second apparatus, the SL synchronization signal including a primary synchronization signal (PSS) and a secondary synchronization signal (SSS) on the frequency location of the SL synchronization signal in the first SL BWP, wherein the information related to the frequency location of the SL synchronization signal represent a center frequency location of the SL synchronization signal within the first SL BWP.

2. The method of claim 1, wherein the information related to the frequency location is an absolute radio frequency channel number (ARFCN) related to a frequency for transmission or reception of the SL synchronization signal.

3. The method of claim 1, wherein a transmission bandwidth of the SL synchronization signal is within a transmission bandwidth of the first SL BWP.

4. The method of claim 1, wherein the first SL BWP is at least one SL BWP in which transmission of the SL synchronization signal is configured.

5. The method of claim 1, wherein the first SL BWP is at least one SL BWP in which transmission of the SL synchronization signal is configured among a plurality of SL BWPs included in one carrier.

6. The method of claim 1, wherein the first SL BWP is at least one BWP in which transmission of the SL synchronization signal is configured among a plurality of SL BWPs included in a plurality of carriers, and
wherein each of the plurality of carriers includes one SL BWP.

7. The method of claim 1, further comprising:
determining at least one SL BWP, for obtaining a priority of a first carrier, from among a plurality of SL BWPs included in the first carrier;
selecting at least one synchronization reference on the at least one SL BWP; and
determining a specific priority from among priorities of the at least one synchronization reference as the priority of the first carrier.

8. The method of claim 7, wherein the at least one SL BWP is at least one SL BWP in which transmission of the SL synchronization signal is configured among the plurality of SL BWPs.

9. The method of claim 7, wherein the specific priority is the highest priority among the priorities of the at least one synchronization reference.

10. The method of claim 7, further comprising:
measuring receiving power for the at least one synchronization reference,
wherein the specific priority is a priority of a synchronization reference having a highest priority among at least one synchronization reference having the receiving power equal to or greater than a threshold value.

11. The method of claim 7, further comprising:
determining a priority of a second carrier including a plurality of BWPs;
selecting a carrier having a higher priority from among the priority of the first carrier and the priority of the second carrier; and
obtaining synchronization for time or frequency for the first carrier and the second carrier from a synchronization reference related to the carrier having the higher priority.

12. The method of claim 7, wherein a direct frame number (DFN) value for a plurality of BWPs included in the first carrier, a DFN offset, a location of a resource related to the SL synchronization signal or a number of resources related to the SL synchronization signal is configured to be the same.

13. A first apparatus configured to perform sidelink (SL) communication, the first apparatus comprising:
one or more memories storing instructions;
one or more transceivers; and
one or more processors connected to the one or more memories and the one or more transceivers,
wherein based on the one or more processors executing the instructions, the one or more processors control the first apparatus to:
receive, from a base station, information related to a first SL bandwidth part (BWP);
receive, from the base station, information related to frequency location of a SL synchronization signal, wherein the frequency location of the SL synchronization signal is within the first SL BWP; and
receive, from a second apparatus, the SL synchronization signal including a primary synchronization signal (PSS) and a secondary synchronization signal (SSS) on the frequency location of the SL synchronization signal in the first SL BWP,
wherein the information related to the frequency location of the SL synchronization signal represent a center frequency location of the SL synchronization signal within the first SL BWP.

14. An apparatus configured to control a first user equipment (UE), the apparatus comprising:
one or more processors; and
one or more memories operatively connected to the one or more processors and storing instructions,
wherein based on the one or more processors executing the instructions, the one or more processors control the first UE to:
receive, from a base station, information related to a first sidelink (SL) bandwidth part (BWP);
receive, from the base station, information related to frequency location of a SL synchronization signal, wherein the frequency location of the SL synchronization signal is within the first SL BWP; and
receive, from a second UE, the SL synchronization signal including a primary synchronization signal (PSS) and a secondary synchronization signal (SSS) on the frequency location of the SL synchronization signal in the first SL BWP,
wherein the information related to the frequency location of the SL synchronization signal represent a center frequency location of the SL synchronization signal within the first SL BWP.

\* \* \* \* \*